US011468000B2

(12) United States Patent
Shainline

(10) Patent No.: US 11,468,000 B2
(45) Date of Patent: Oct. 11, 2022

(54) FLUXONIC PROCESSOR AND PROCESSING PHOTONIC SYNAPSE EVENTS

(71) Applicant: Government of the United States of America, as represented by the Secretary of Commerce, Gaithersburg, MD (US)

(72) Inventor: Jeffrey Michael Shainline, Boulder, CO (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 372 days.

(21) Appl. No.: 16/823,601

(22) Filed: Mar. 19, 2020

(65) Prior Publication Data

US 2020/0301874 A1    Sep. 24, 2020

Related U.S. Application Data

(60) Provisional application No. 62/820,554, filed on Mar. 19, 2019.

(51) Int. Cl.
*G06F 15/78* (2006.01)
*G06N 3/067* (2006.01)

(52) U.S. Cl.
CPC ............. *G06F 15/78* (2013.01); *G06N 3/067* (2013.01)

(58) Field of Classification Search
CPC ................. G06F 15/78; G06N 3/067

USPC .......................................... 706/27
See application file for complete search history.

(56) References Cited

PUBLICATIONS

S. M. Buckley, A. N. McCaughan, J. Chiles, R. P. Mirin, S. W. Nam, J. M. Shainline. Superconducting optoelectronic platform for neuromorphic computing. CLEO 2017 © OSA 2017 (Year: 2017).*
S. M. Buckley et Al. Design of superconducting optoelectronic networks for neuromorphic computing. 2018 IEEE International Conference on Rebooting Computing (ICRC) (Year: 2018).*
Jeffrey M. Shainline, Sonia M. Buckley, Richard P. Mirin, and Sae Woo Nam. Neuromorphic computing with integrated photonics and superconductors. 2016 IEEE International Conference on Rebooting Computing (ICRC). (Year: 2016).*

(Continued)

*Primary Examiner* — Collin X Beatty
(74) *Attorney, Agent, or Firm* — Office of Chief Counsel for National Institute of Standards and Technology

(57) ABSTRACT

A fluxonic processor includes processes photonic synapse events and includes a transmitter that receives neuron signal and produces output photons; a neuron that receives a dendrite signal and produces the neuron signal from the dendrite signal; a dendrite that receives a synapse signal, and produces the dendrite signal from the synapse signal, the dendrite including: a dendritic receiver loop; a dendritic Josephson isolator; and a dendritic integration loop; and the synapse in electrical communication with the dendrite and that receives an input photon and produces the synapse signal from the input photon, the synapse including: a synaptic receiver; a synaptic Josephson isolator in communication with the synaptic receiver; and a synaptic integration loop that receives the synaptic receiver fluxons and produces the synapse signal from the synaptic receiver fluxons.

15 Claims, 19 Drawing Sheets

(56) References Cited

PUBLICATIONS

Y. Mizugaki, K. Nakajima, Y. Sawada, and T. Yamashita. Superconducting Implementation of Neural Networks Using Fluxon Pulses. IEEE Transaciions on Applied Superconductivity. vol. 3, No. I, Mar. 1993 (Year: 1993).*

Crotty, P., et al., "Josephson junction simulation of neurons", Physical Review, 2010, p. 011914, vol. 82.

Hirose, T., et al., "Pulsed neural networks consisting of single-flux-quantum spiking neurons", Physica C, 2007, p. 1072-1075, vol. 463-465.

Segall, K. et al., "Synchronization dynamics on the picosecond time scale in coupled Josephson junction neurons" Physical Review, 2017, p. 032220, vol. 95.

* cited by examiner

FLUXONIC PROCESSOR AND PROCESSING PHOTONIC SYNAPSE EVENTS

CROSS REFERENCE TO RELATED APPLICATIONS

The application claims priority to U.S. Provisional Patent Application Ser. No. 62/820,554 filed Mar. 19, 2019, the disclosures of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 99; voice (301)-975-2573; email tpo@nist.gov; reference NIST Docket Number 19-030US1.

BRIEF DESCRIPTION

Disclosed is a fluxonic processor for fluxonic processing of photonic synapse events, the fluxonic processor comprising: a transmitter that receives neuron signal and produces output photons from the neuron signal; a neuron in electrical communication with the transmitter and that receives a dendrite signal, produces the neuron signal from the dendrite signal, and communicates the neuron signal to the transmitter; a dendrite in electrical communication with the neuron and that receives a synapse signal, produces the dendrite signal from the synapse signal, and communicates the dendrite signal to the neuron, the dendrite comprising: a dendritic receiver loop that receives the synapse signal from a synapse and produces dendrite receiver fluxons; a dendritic Josephson isolator in communication with the dendritic receiver loop and that receives the dendrite receiver fluxons from the dendritic receiver loop; and a dendritic integration loop that receives the dendrite receiver fluxons from the dendritic Josephson isolator and produces the dendrite signal from the dendrite receiver fluxons; and the synapse in electrical communication with the dendrite and that receives an input photon, produces the synapse signal from the input photon, and communicates the synapse signal to the dendrite, the synapse comprising: a synaptic receiver that receives the input photon and produces synaptic receiver fluxons; a synaptic Josephson isolator in communication with the synaptic receiver and that receives the synaptic receiver fluxons from the dendritic receiver loop; and a synaptic integration loop that receives the synaptic receiver fluxons from the synaptic Josephson isolator and produces the synapse signal from the synaptic receiver fluxons.

Disclosed is a process for fluxonic processing of photonic synapse events with the fluxonic processor, the process comprising: receiving an input photon by the synaptic receiver of the synapse; producing fluxons by the synaptic receiver; receiving the fluxons by the synaptic Josephson isolator from the synaptic receiver; communicating fluxons from the synaptic Josephson isolator to the synaptic integration loop; receiving the fluxons from the synaptic Josephson isolator by the synaptic integration loop; producing a synaptic integrated current from the fluxons by a synaptic coupling inductor; inductively coupling the synaptic integrated current from the synaptic integrated current to a mutual inductor of the dendrite; receiving the synaptic integrated current by the mutual inductor from the synaptic integration loop; producing dendrite current in the dendritic receiver loop from receiving the synaptic integrated current; receiving the dendritic current from the dendritic receiver loop by the dendritic Josephson isolator; communicating fluxons from the dendritic Josephson isolator to the dendritic integration loop in response to receiving the dendritic current; receiving fluxons from the dendritic Josephson isolator by the dendritic integration loop; and producing dendritic integrated current as a dendrite signal in response to receiving the fluxons by the dendritic integration loop to fluxonic process receipt of the input photon with the fluxonic processor.

BRIEF DESCRIPTION OF THE DRAWINGS

The following description cannot be considered limiting in any way. With reference to the accompanying drawings, like elements are numbered alike.

DETAILED DESCRIPTION

Figure 1:
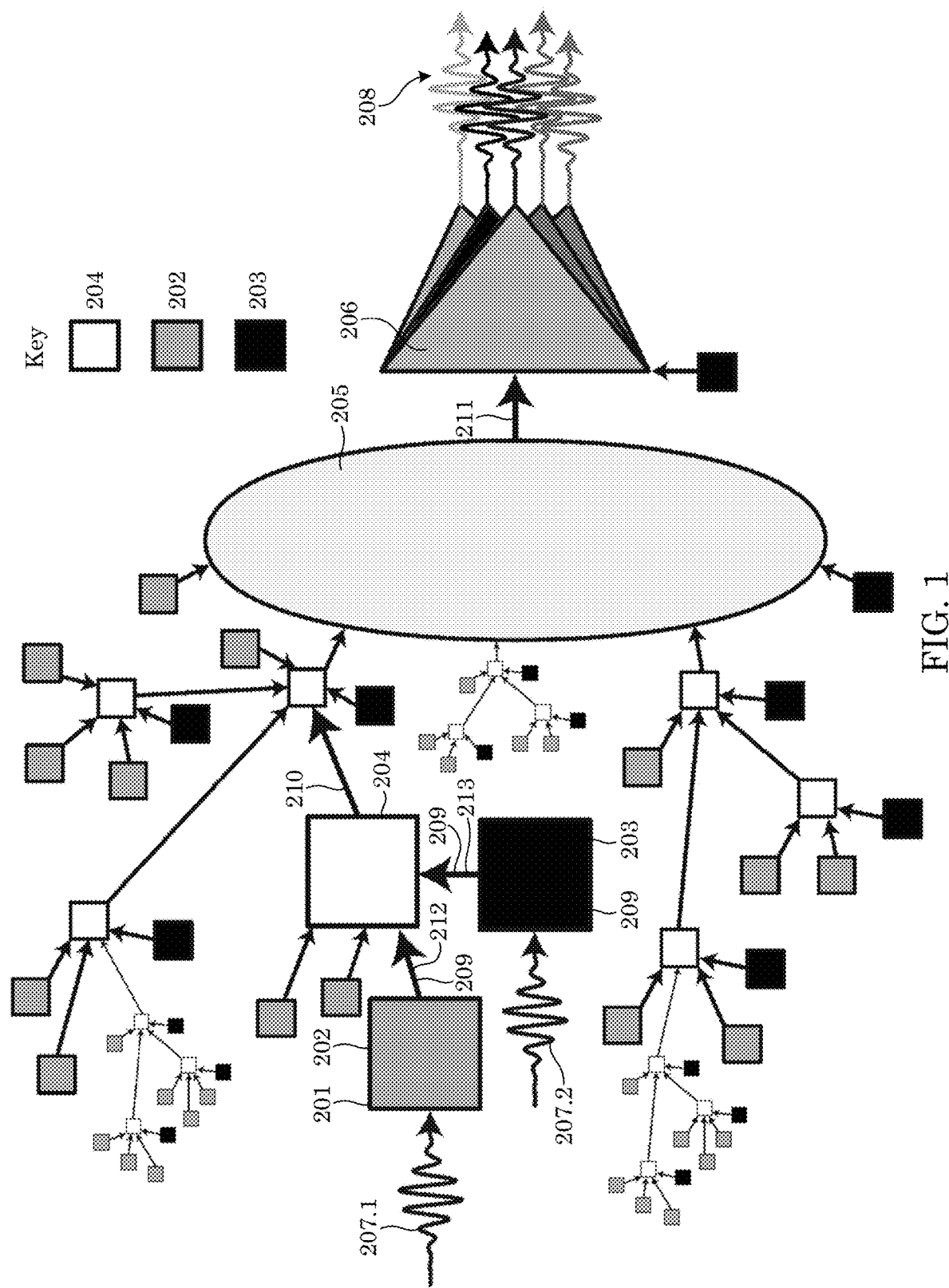
FIG. 1 shows a fluxonic processor, wherein optical signals are represented by wavy arrows, while electrical signals are represented by straight, black arrows. The structure includes excitatory and inhibitory synapses ($S_e$ and $S_i$) that feed into dendrites (D). Each dendrite performs computations on the inputs and communicates the result to other dendrites for further processing or on to the cell body of the neuron (N). The neuron acts as a final thresholding stage, and when its threshold is reached, light is produced by the transmitter (T), which is routed to downstream synaptic connections. Multiple photons are shown to emanate from the transmitter, indicating use of different frequencies of light.

A detailed description of one or more embodiments is presented herein by way of exemplification and not limitation.

It has been discovered a fluxonic processor herein provides circuits that include single-photon detectors, Josephson junctions, and mutual inductors to perform transduction and electronic computation for neuromorphic computing and single-photon imaging. Computations include operations performed by synapses, dendrites, and neurons. The fluxonic processor transduces single photons to fluxons for subsequent processing. A transducer circuit applies a synaptic weight in analog mode, and a dendrite of the fluxonic processor receives input from synapses or dendrites, performs nonlinear transfer functions on the inputs, and produces a dendrite signal 210 that can be communicated to other dendrites or to a neuron.

Fluxonic processor 200 performs fluxonic processing of photonic synapse events. In an embodiment, with reference to FIG. 1, FIG. 2, and FIG. 3, fluxonic processor 200 includes: fluxonic processor 200 including: transmitter 206 that receives neuron signal 211 and produces output photons 208 from neuron signal 211; neuron 205 in electrical communication with transmitter 206 and that receives dendrite signal 210, produces neuron signal 211 from dendrite signal 210, and communicates neuron signal 211 to transmitter 206; dendrite 204 in electrical communication with neuron 205 and that receives synapse signal 209, produces dendrite signal 210 from synapse signal 209, and communicates dendrite signal 210 to neuron 205, dendrite 204 including: dendritic receiver loop 233 that receives synapse signal 209 from synapse 201 and produces dendrite receiver fluxons; dendritic Josephson isolator 225 in communication with dendritic receiver loop 233 and that receives dendrite receiver fluxons from dendritic receiver loop 233; and dendritic integration loop 235 that receives dendrite receiver fluxons from dendritic Josephson isolator 225 and produces dendrite signal 210 from dendrite receiver fluxons; and synapse 201 in electrical communication with dendrite 204 and that receives input photon 207, produces synapse signal 209 from input photon 207, and communicates synapse signal 209 to dendrite 204, synapse 201 including: synaptic receiver 220 that receives input photon 207 and produces synaptic receiver fluxons 229; synaptic Josephson isolator 225 in communication with synaptic receiver 220 and that receives synaptic receiver fluxons 229 from dendritic receiver loop 233; and synaptic integration loop 221 that receives synaptic receiver fluxons 229 from synaptic Josephson isolator 225 and produces synapse signal 209 from synaptic receiver fluxons 229.

Figure 2:
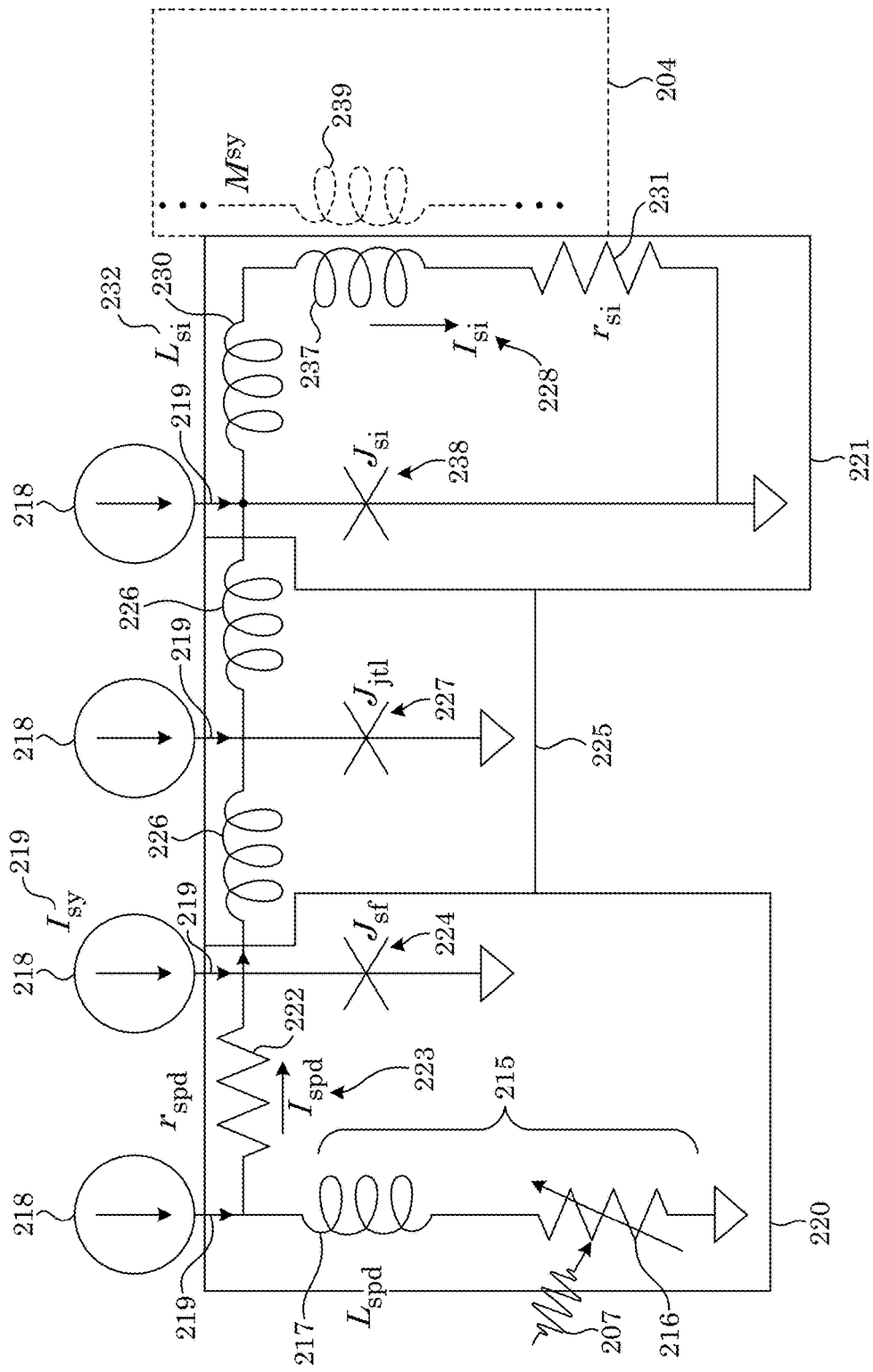
FIG. 2 shows a synapse, wherein a photonic communication event with one or more photons diverts current from the single-photon detector (SPD) to the synaptic firing junction ($I_{spd}$ to $J_{sf}$). A series of fluxons is produced, and these fluxons traverse the Josephson transmission line ($J_{jtl}$) and result in an integrated current in the synaptic integration loop ($I_{si}$). This synaptic signal is communicated to a dendritic receiving (DR) loop through a mutual inductor.
Figure 3:
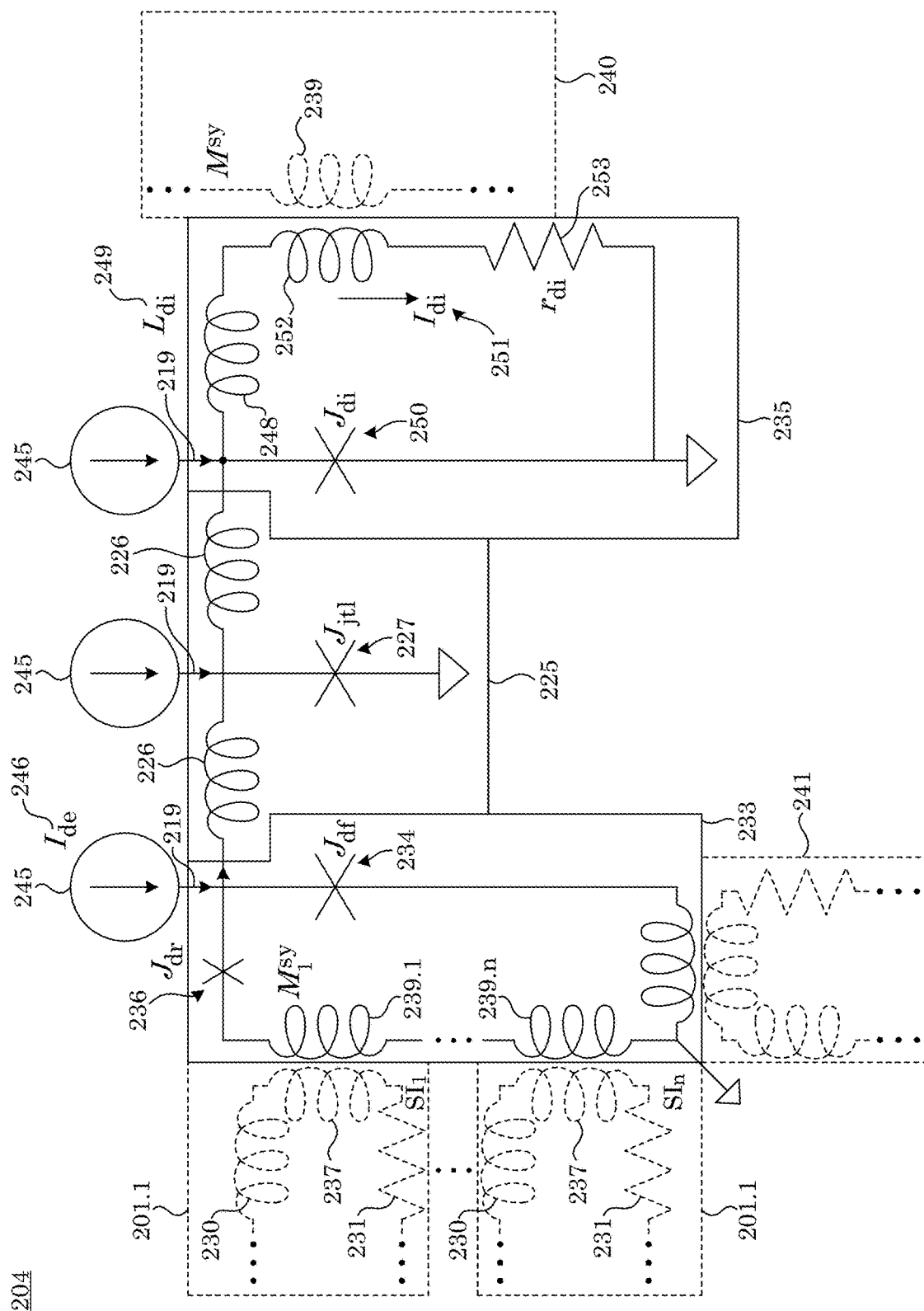
FIG. 3 shows a dendrite, wherein a dendritic receiver loop sums the signals from afferent synapses, and upon reaching the threshold established by the dendritic firing junction (Jdf), one or a series of fluxons is generated. Inhibitory (IH) or rapid query (RQ) synapses can also be established on the DR loop. The generated signal is communicated to other dendritic receiving loops or to the neuronal receiving (NR) loop of the neuron cell body. While drawn in the same place, either IH or RQ will be present on a given dendrite, and these loops require opposite signs of mutual inductance.

In an embodiment, with reference to FIG. 1, FIG. 2, and FIG. 3, synaptic receiver 220 includes: single photon detector 215 that includes: variable resistor 216 that receives input photon 207; and photodetector inductor 217 in electrical communication with variable resistor 216; synapse current source 218 in electrical communication with photodetector inductor 217 and that provides synaptic bias current 219; photodetector resistor 222 in electrical communication with photodetector inductor 217 and that provides photodetector current 223 to synaptic receiver 220; and synaptic firing junction 224 in electrical communication with photodetector resistor 222, wherein synaptic receiver 220 produces fluxons 229 in response to receiving input photon 207. Synaptic Josephson isolator 225 includes: isolation inductor 226 in communication with synaptic firing junction 224 and that receives fluxons from synaptic receiver 220; synapse current source 218 in communication with isolation inductor 226 and that provides synaptic bias current 219 to synaptic Josephson isolator 225; and Josephson transmission line 227 in electrical communication with isolation inductor 226.

Synaptic integration loop 221 includes: synaptic integration inductor 230 in communication with synaptic Josephson isolator 225 and that receives fluxons from synaptic Josephson isolator 225 and provides synaptic integration loop inductance 232; synaptic integration Josephson junction 238 in communication with isolation inductor 226 of synaptic Josephson isolator 225; synaptic coupling inductor 237 in communication with synaptic integration inductor 230 and that provides synaptic integrated current 228 to synaptic integration loop 221; and synaptic integration resistor 231 in communication with synaptic integration resistor 231.

In an embodiment, with reference to FIG. 1, FIG. 2, and FIG. 3, dendritic receiver loop 233 includes: mutual inductor 239 inductively coupled to synaptic integration loop 221 of synapse 201; dendritic reset junction 236 in electrical communication with mutual inductor 239; dendrite current source 245 in electrical communication with dendritic reset junction 236 and that provides dendritic bias current 246; dendritic firing junction 234 in electrical communication with dendritic reset junction 236 and dendrite current source 245; and dendrite receiver inductor 247 in electrical communication with dendritic firing junction 234 and mutual inductor 239. Dendritic Josephson isolator 225 includes: isolation inductor 226 in communication with dendritic firing junction 234 and that receives fluxons from dendritic receiver loop 233; dendrite current source 245 in communication with isolation inductor 226 and that provides bias current to dendritic Josephson isolator 225; and Josephson transmission line 227 in electrical communication with isolation inductor 226.

Dendritic integration loop 235 includes: dendritic integration Josephson junction 250 in communication with dendritic Josephson isolator 225 and that receives fluxons from dendritic Josephson isolator 225; dendritic integration inductor 248 in communication with dendritic integration Josephson junction 250 and that provides dendritic integration loop inductance 249 to dendritic integration loop 235; dendritic coupling inductor 252 in communication with dendritic integration inductor 248 and that provides dendritic integrated current 251 to dendritic integration loop 235; and dendritic integration resistor 253 in communication with dendritic integrated current 251.

Figure 4:
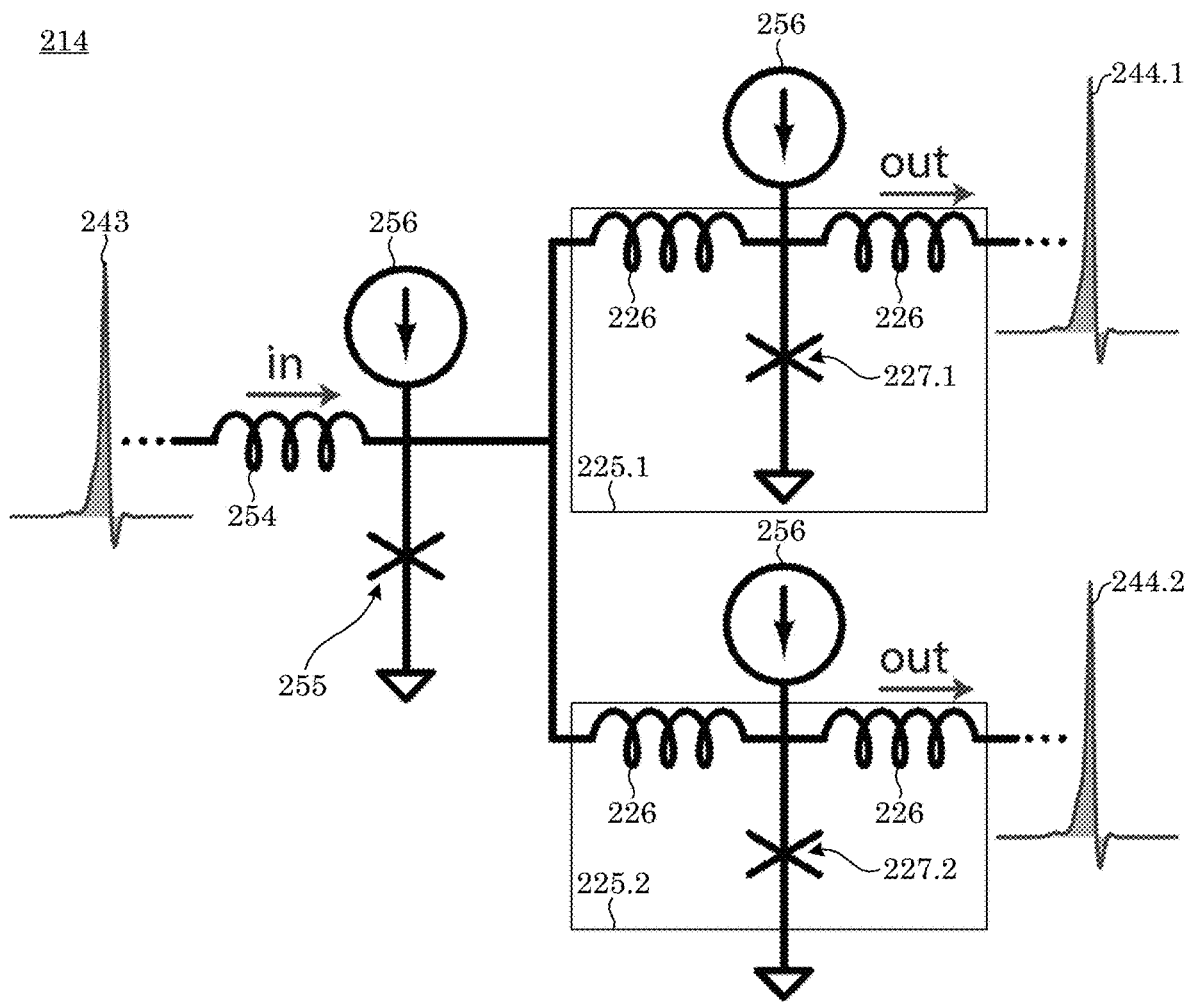
FIG. 4 shows a fluxon pulse splitter, wherein this circuit makes electronic copies of the information generated by a synapse or a dendrite, and the amplitudes of the current pulses at the outputs are restored to the input level.

In an embodiment, with reference to FIG. 4, fluxonic processor 200 includes fluxon pulse splitter 214 in electrical communication with dendrite 204 and that receives dendrite signal 210 from dendrite 204 and splits dendrite signal 210 into first output signal 244.1 and second output signal 244.2, wherein first output signal 244.1 and second output signal 244.2 are dendrite signals. Fluxon pulse splitter 214 includes: splitter input inductor 254 that receives dendrite signal 210 as input signal 243; splitter current source 255 and splitter current source 256 in electrical communication with splitter input inductor 254; first Josephson isolator 225.1 in electrical communication with splitter input inductor 254 and that receives fluxons from splitter input inductor 254 and produces first output signal 244.1 from fluxons; and second Josephson isolator 225.2 in electrical communication with splitter input inductor 254 and that receives fluxons from splitter input inductor 254 and produces second output signal 244.2 from fluxons. First Josephson isolator 225.1 and second Josephson isolator 225.2 are electrically connected in parallel to splitter input inductor 254 and independently include: isolation inductor 226 that receives fluxons from splitter input inductor 254; splitter current source 256 in communication with isolation inductor 226 and that provides bias current to Josephson isolator 225; and Josephson transmission line 227 in electrical communication with isolation inductor 226.

In an embodiment, with reference to FIG. 4, fluxonic processor 200 includes fluxon pulse splitter 214 in electrical communication with synapse 201 and that receives synapse signal 209 from synapse 201 and splits synapse signal 209 into first output signal 244.1 and second output signal 244.2, wherein first output signal 244.1 and second output signal 244.2 are synapse signals. Fluxon pulse splitter 214 includes: splitter input inductor 254 that receives synapse signal 209 as input signal 243; splitter current source 255 and splitter current source 256 in electrical communication with splitter input inductor 254; first Josephson isolator 225.1 in electrical communication with splitter input inductor 254 and that receives fluxons from splitter input inductor 254 and produces first output signal 244.1 from fluxons; and second Josephson isolator 225.2 in electrical communication with splitter input inductor 254 and that receives fluxons from splitter input inductor 254 and produces second output signal 244.2 from fluxons. First Josephson isolator 225.1 and second Josephson isolator 225.2 are electrically connected in parallel to splitter input inductor 254 and independently include: isolation inductor 226 that receives fluxons from splitter input inductor 254; splitter current source 256 in communication with isolation inductor 226 and that provides bias current to Josephson isolator 225; and Josephson transmission line 227 in electrical communication with isolation inductor 226.

Figure 7:
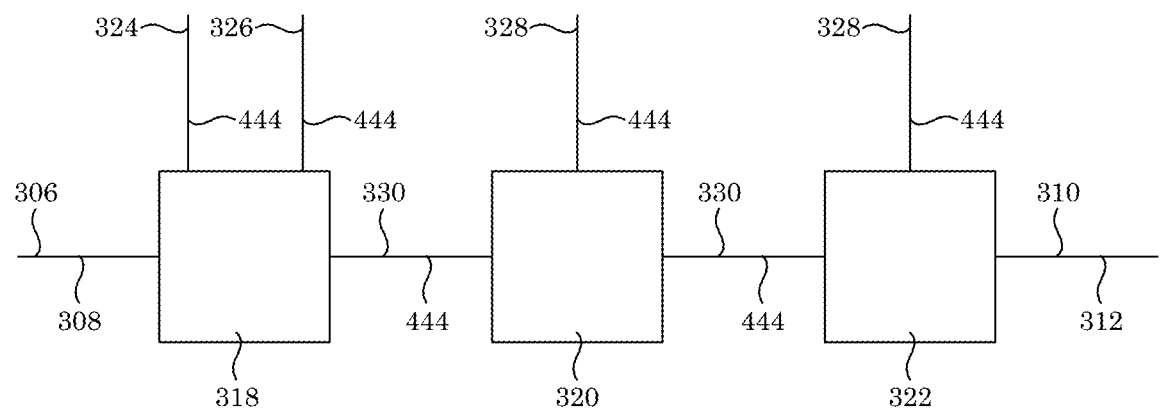
FIG. 7 shows a synapse 201.

Synapse 201 receives input photon 207 and produces synaptic integrated current 228 that is communicated to dendrite 204 through inductively coupled synaptic coupling inductor 237 and mutual inductor 239 as shown in FIG. 2. In an embodiment, with reference to FIG. 7, optoelectronic synapse 201 includes optoelectronic synapse receiver 318 in communication with photonic synaptic input waveguide 308; receives photonic synaptic input 306 from photonic synaptic input waveguide 308, optoelectronic synapse receiver bias 324, and optoelectronic synapse synaptic bias current 326; and produces optoelectronic synapse internal electrical signal 330 from photonic synaptic input 306, optoelectronic synapse receiver bias 324, and optoelectronic synapse synaptic bias current 326. Optoelectronic synapse transmission line 320 is in communication with optoelectronic synapse receiver 318, receives optoelectronic synapse internal electrical signal 330 from optoelectronic synapse receiver 318; receives superconducting current bias 328; and produces optoelectronic synapse internal electrical signal 330 and superconducting current bias 328. Optoelectronic synapse electronic storage 322 is in communication with optoelectronic synapse transmission line 320; receives optoelectronic synapse internal electrical signal 330 from optoelectronic synapse transmission line 320; receives superconducting current bias 328; and produces optoelectronic synapse electronic output signal 310 from optoelectronic synapse internal electrical signal 330 and superconducting current bias 328. It is contemplated that synapse 201 includes excitatory synapse 202 and inhibitory synapse 203, wherein excitatory synapse 202 produces synapse signal 209 that is excitatory signal 212 that increases activity of dendrite 204 that receives excitatory signal 212, and inhibitory synapse 203 produces synapse signal 209 that is inhibitory signal 213 that decreases activity of dendrite 204 that receives inhibitory signal 213.

Figure 8:
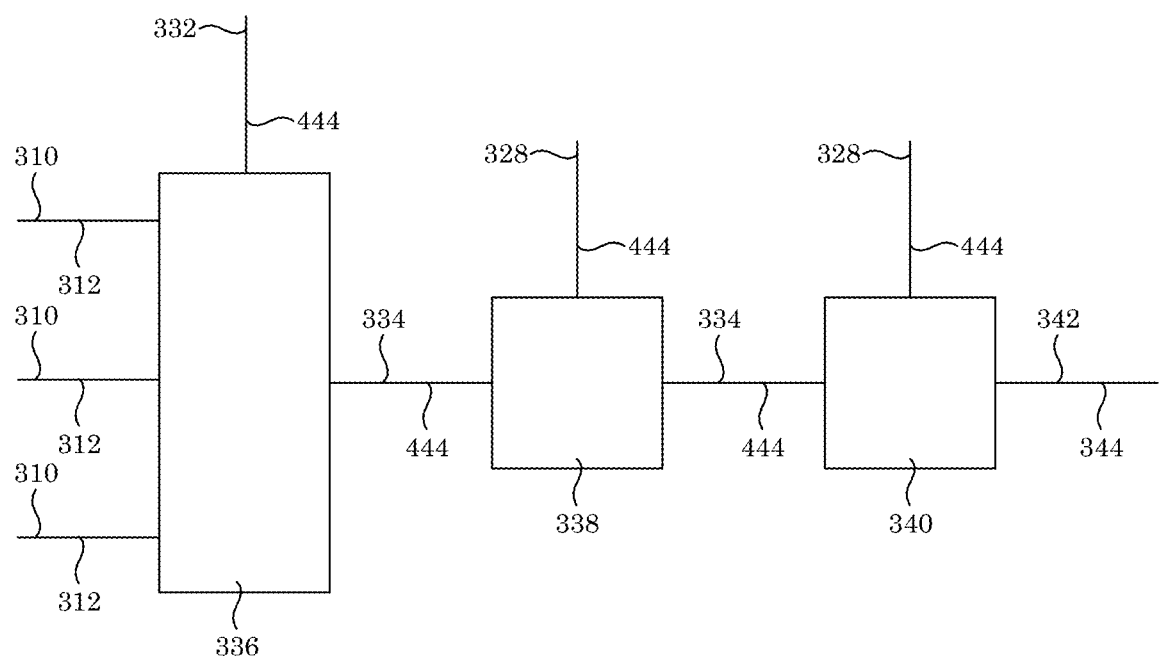
FIG. 8 shows a dendrite 204.

Dendrite 204 receives an electronic signal, e.g., that coupled from synapse 201 from production of synaptic integrated current 228 and inductively coupled to dendrite 204 via synaptic coupling inductor 237 as shown in FIG. 3. In an embodiment, with reference to FIG. 8, dendrite 204 includes electronic dendrite receiver 336 in communication with synapto-dendritic electrical connection 312 and that receives optoelectronic synapse electronic output signal 310 from synapto-dendritic electrical connection 312; receives electronic dendrite dendritic bias current 332; and produces electronic dendrite internal electrical signal 334 from optoelectronic synapse electronic output signal 310 and electronic dendrite dendritic bias current 332. Electronic dendrite electrical transmission line 338 is in communication with electronic dendrite receiver 336; receives electronic dendrite internal electrical signal 334 from electronic dendrite receiver 336; receives superconducting current bias 328; and produces second electronic dendrite internal electrical signal 334 from superconducting current bias 328 and electronic dendrite internal electrical signal 334. Electronic dendrite electronic storage 340 is in communication with electronic dendrite electrical transmission line 338; receives electronic dendrite internal electrical signal 334 from electronic dendrite electrical transmission line 338; receives second superconducting current bias 328; and produces electronic dendrite electronic output signal 342 from second electronic dendrite internal electrical signal 334 and second superconducting current bias 328.

Figure 5:
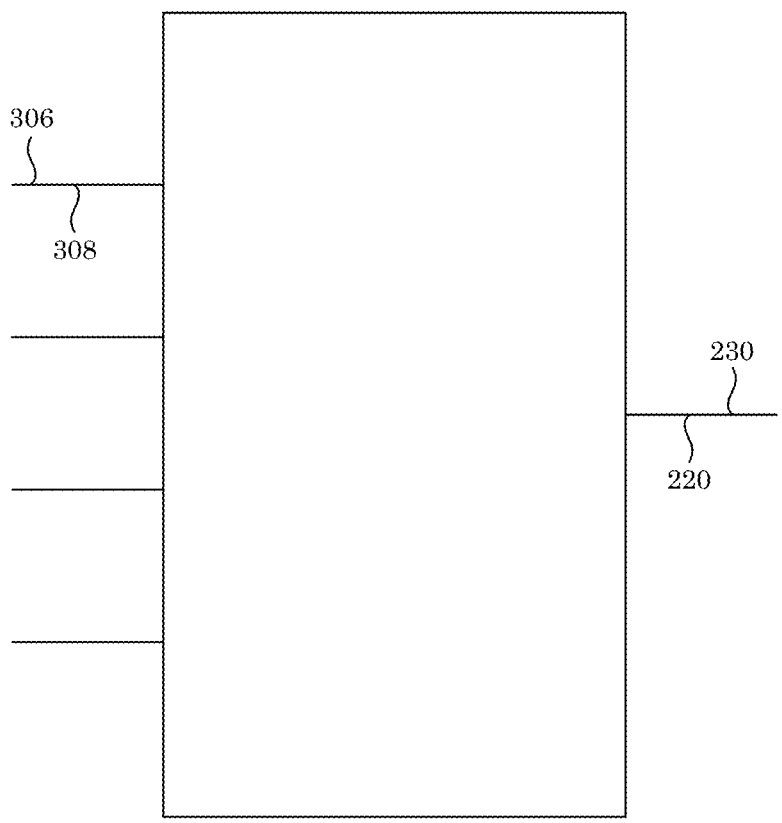
FIG. 5 shows a neuron 205.
Figure 6:
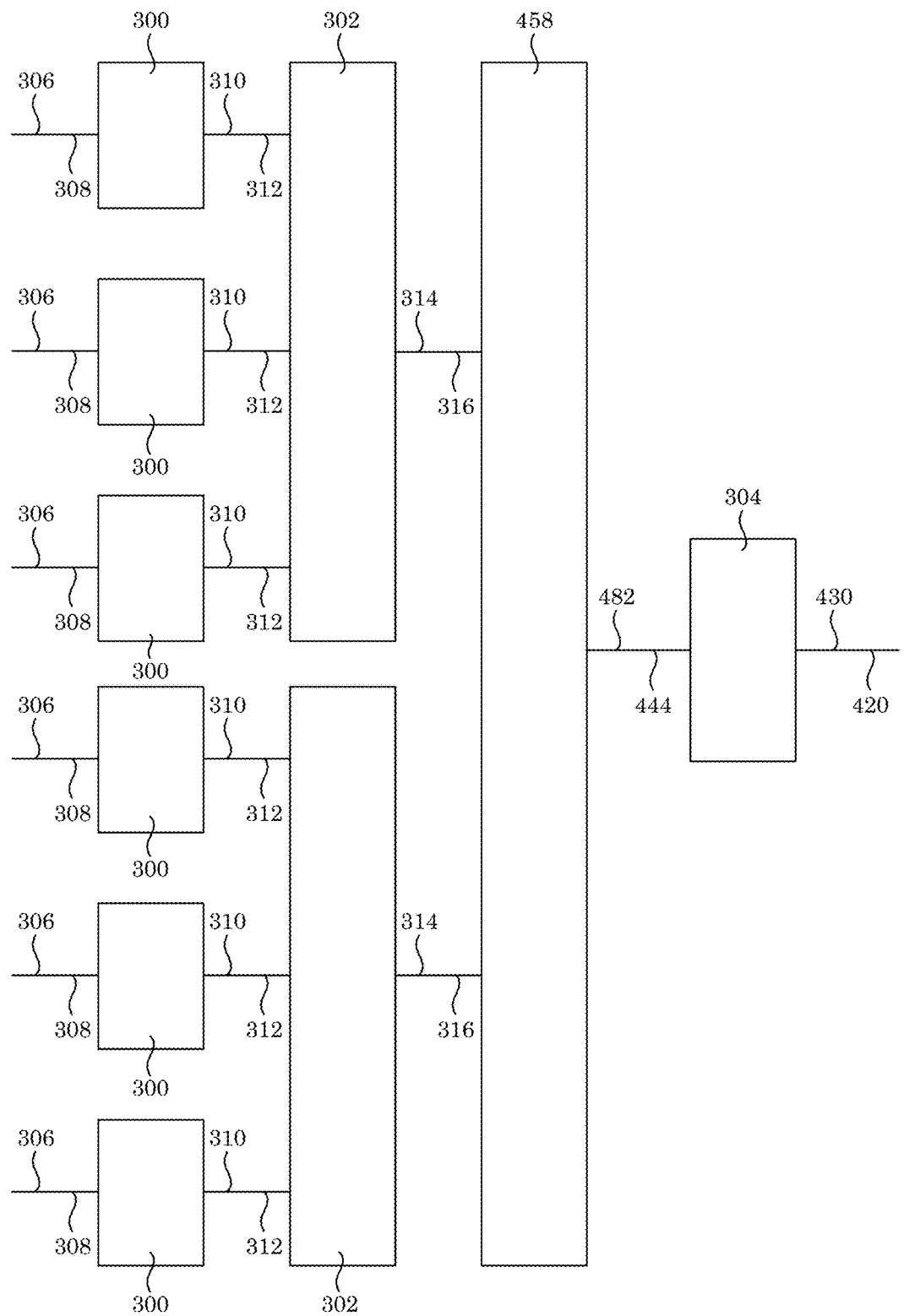
FIG. 6 shows a neuron 205.

Neuron 205 receives electronic signals from dendrite 204 as shown in FIG. 1. In an embodiment, with reference to FIG. 5, neuron 205, also referred to as primary single photon optoelectronic neuron, is in communication with photonic synaptic input waveguide 308 to receive photonic synaptic input 306 and in communication with axonic waveguide 420 to communicate axonic photonic signal 430 produced by neuron 205 from photonic synaptic input 306. In an embodiment, with reference to FIG. 6, neuron 205 includes photonic synaptic input waveguide 308; synapse 201 in communication with photonic synaptic input waveguide 308. Synapse 201 receives photonic synaptic input 306 from photonic synaptic input waveguide 308; and produces optoelectronic synapse electronic output signal 310 from photonic synaptic input 306. Synapto-dendritic electrical connection 312 is in communication with synapse 201 and receives optoelectronic synapse electronic output signal 310. Dendrite 204 is in communication with synapto-dendritic electrical connection 312 and receives optoelectronic synapse electronic output signal 310 from synapto-dendritic electrical connection 312 and produces electronic dendrite electrical output signal 314 from optoelectronic synapse electronic output signal 310. Dendrite-neuronal electrical interface 316 is in communication with dendrite 204 and receives electronic dendrite electrical output signal 314. Integrator 458 is in communication with dendrite-neuronal electrical interface 316, receives electronic dendrite electrical output signal 314 from dendrite-neuronal electrical interface 316, and produces axonic electrical signal 482 from electronic dendrite electrical output signal 314. Superconducting wire 444 is in communication with integrator 458 and receives axonic electrical signal 482. Axon hillock electronic-to-photonic transducer 304 is in communication with superconducting wire 444, receives axonic electrical signal 482 from superconducting wire 444, and produces axonic photonic signal 430 from axonic electrical signal 482. Axonic waveguide 420 is in communication with axon hillock electronic-to-photonic transducer 304 and receives axonic photonic signal 430 from axon hillock electronic-to-photonic transducer 304.

Figure 9:
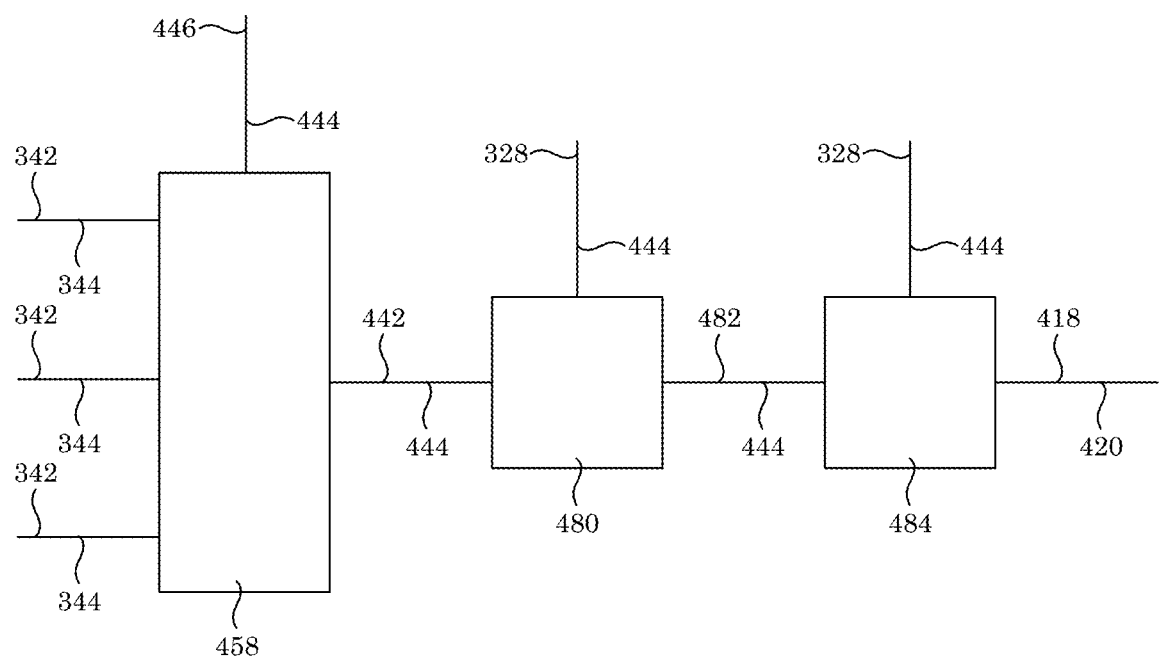
FIG. 9 shows axon hillock electronic-to-photonic transducer
Figure 10:
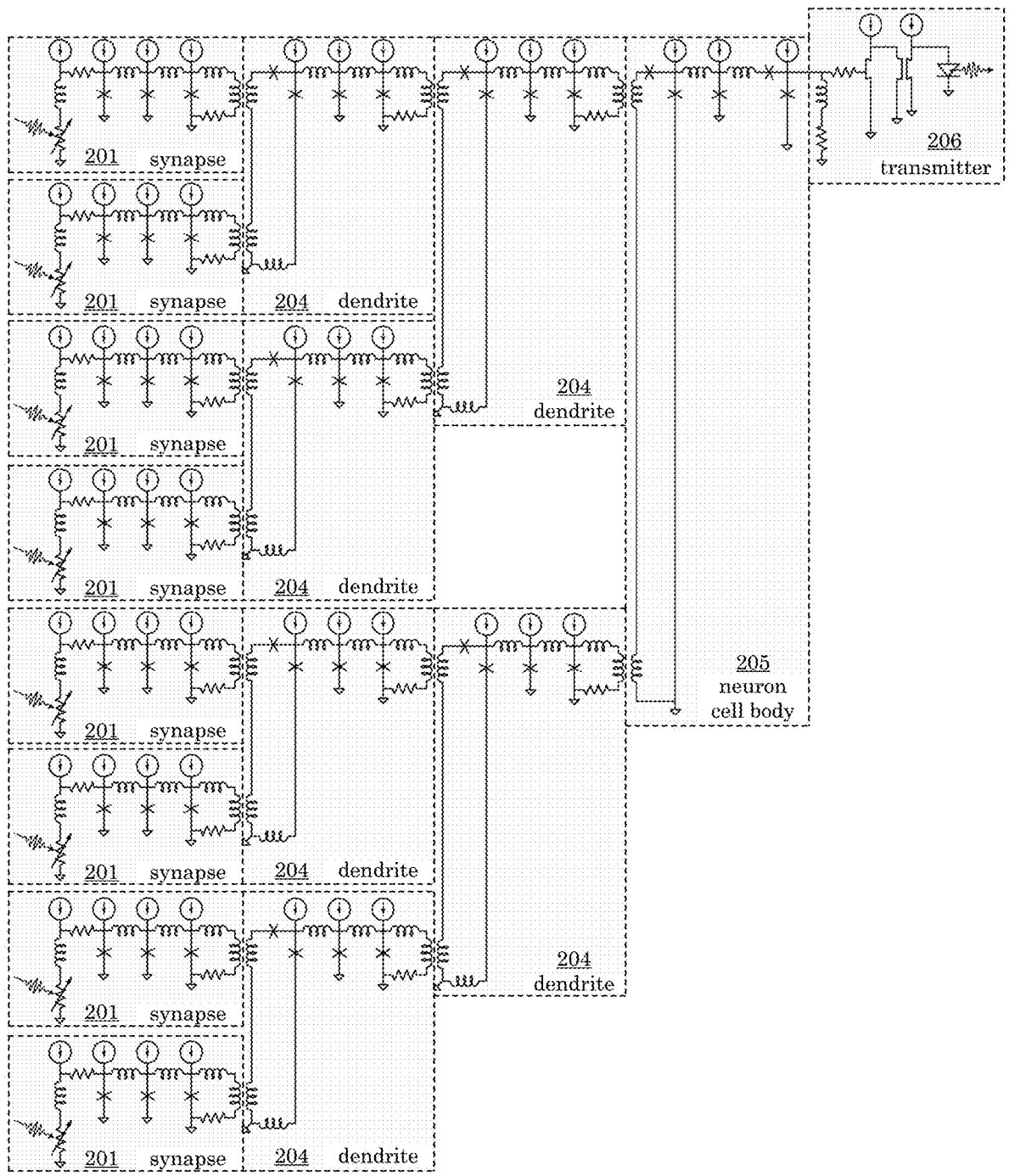
FIG. 10 shows a fluxonic processor 200.

In an embodiment, with reference to FIG. 9, transmitter 206, also referred to herein as axon hillock electronic-to-photonic transducer 304, includes integrator 458 in communication with electrical interface 344 and that receives electronic dendrite electronic output signal 342 from electrical interface 344; receives threshold control bias 346; and produces threshold signal 442 from electrical interface 344 and threshold control bias 346. Superconducting voltage amplifier 480 is in communication with integrator 458; receives threshold signal 442 from integrator 458; receives superconducting current bias 328; and produces axonic electrical signal 482 from threshold signal 442 and axonic electrical signal 482. Axonic photon emitter 484 is in communication with superconducting voltage amplifier 480; receives axonic electrical signal 482 from superconducting voltage amplifier 480; receives second superconducting current bias 328; and produces axonic photonic signal 418 from second superconducting current bias 328 and axonic electrical signal 482.

Embodiments of fluxonic processor 200 can include circuitry elements described in U.S. patent application Ser. Nos. 15/841,701 and 16/542,913, the disclosures of which are incorporated by reference herein in their entirety.

Sources of input photon 207 can include semiconductor lasers, semiconductor light emitting diodes, other semiconductor light sources, modulators, or switches to produce or redirect light and can be semiconductor light-emitting diodes or semiconducting switches.

In fluxonic processor 200, single photon detector 215 can include semiconducting or superconducting photon detectors to produce electrical signals due to the presence of photons and can be superconducting nanowire single photon detectors or semiconducting photodiodes operating in photovoltaic or photoconductive mode.

In fluxonic processor 200, synapse 201 can include electrical circuits to convert a photonic signal to the electrical domain and can include resistors, inductors, capacitors, Josephson junctions, or other superconducting circuit elements. Synapse signal 209 can include an electronic signal to communicate the output of synapse 201.

In fluxonic processor 200, synaptic integration loop 221, dendritic integration loop 235, and integrator 458 independently can include electrical components to integrate the electrical signals and can be superconducting wires, capacitors, inductors, or superconducting loops.

Waveguides, e.g., axonic waveguide 420 and axonal waveguide arbors route photonic signals and can be nanophotonic waveguides made of silicon, silicon nitride, or other materials with index of refraction larger than the containing material or vacuum. It is contemplated that a neuron can include synapses that use superconducting photon detectors to convert optical signals to electrical signals, and these synapses can be superconducting-nanowire single-photon detectors made from materials such as WSi, NbN, NbTiN, MoSi, or other superconducting materials. Synapses can also include optically absorptive materials. The synapses can also include electronic circuit elements such as resistors, inductors, capacitors, and Josephson junctions. In particular, Josephson junctions can play the role of converting photons to fluxons which can then be stored in the integrator.

Photon emitters can be included in fluxonic processor 200 to produce light or to redirect light from an external light source. The photon emitters could be light-emitting diodes, lasers, or optical modulators.

It is contemplated that neurons or other elements include superconducting voltage amplifiers to produce enough voltage to produce light from a semiconductor or redirect light from an external source. These voltage amplifiers could be elements making use of the superconducting-to-normal phase transition by heating a wire above its critical temperature or by exceeding a wire's critical current density. These voltage amplifiers could include a Josephson junction amplifier such as a Suzuki stack.

Waveguides, e.g., the axonal waveguide arbor, routes photonic signals from neurons to other neurons. The axonal waveguide arbor can contain multiple planes of waveguides. The axonal waveguide arbor can contain components such as in-plane waveguide crossings, inter-planar transitions, photonic beam taps, and axonal arbor waveguides.

Input communication paths to fluxonic processor 200 can include free-space optical communication, fiber optics, waveguides, on-chip waveguides, or electrical wires to produce an optical or electrical signal and can be any optical or electrical communication path.

Primary sources of photons can include external light sources, external current sources, external voltage sources, or photonic or electrical signals generated on chip to activate primary single-photon optoelectronic neuron and can include a light or electrical source.

Photonic signals can include optical signals or any frequency to communicate electromagnetic radiation.

Waveguides and the like can include a propagation path in free space or a dielectric medium, a dielectric waveguide made of silicon, silicon nitride, or other dielectric, insulating, metallic, or superconducting waveguide material to communicate photonic signal and can be a material to guide electromagnetic radiation.

The synapse can include photon detectors, photon absorbers, photon sources, resistors, inductors, capacitors, superconducting circuit elements, Josephson junctions, and the like to modify a photonic signal and can be superconducting photon detectors, superconducting wires, Josephson circuits, or like device.

Dendritic signal 210 can be an electrical signal to communicate from the synapse to the neuron and can include currents, supercurrents, or voltages.

Dendritic communication paths can include waveguides, electrical wires, superconducting wires, or free space to carry dendritic signals and the like.

Axonic photonic signal 230 can include light and electrical signals for communication and can be photons, electrical currents, or electrical voltages.

Recipient can be used to receive the signal output from neuron, dendrites, or synapses and can be a superconducting photon detector, a semiconducting photon detector, a superconducting circuit, a waveguide, a wire, and the like. Receivers can be used and can include superconducting photon detectors, waveguides, electrical components such as resistors, capacitors, inductors, superconducting circuit elements, Josephson junctions, electrical wires, light sources such as light-emitting diodes and lasers and can be superconducting photon detectors, waveguides, electrical components such as resistors, capacitors, inductors, superconducting circuit elements, Josephson junctions, electrical wires, light sources such as light-emitting diodes and lasers.

Threshold signal 242 can include photonic signals, electrical currents, electrical voltages to communicate that a threshold has been reached and can be photonic pulses, electrical current pulses, or electrical voltage pulses.

Superconducting wire 244 can include superconducting wires, films, and materials to transmit electrical signals and can be Nb, WSi, NbN, NbTiN, Al, or other superconducting materials.

Electronic dendrite electrical transmission line 338 receives electronic dendrite internal electrical signal 330 from electrical dendrite receiver 336. Electronic dendrite transmission line 338 communicates the signal from receiver 336 to electronic dendrite electronic storage 340. In an embodiment, electronic dendrite electrical transmission line 338 is a Josephson transmission line including a Josephson junction. In an embodiment, electronic dendrite electrical transmission line 338 receive a superconducting current bias. In an embodiment, electronic dendrite electrical transmission line 338 communicates electrical current or voltage to electronic dendrite electronic storage 340. In an embodiment, electronic dendrite electronic transmission line is a metal, superconducting wire, or Josephson transmission line.

Electronic dendrite electronic storage 340 receives the output from electronic dendrite electronic transmission line 338 or directly from electronic dendrite receiver 336 and stores the signal in a circuit. In an embodiment, the storage circuit can comprise an inductor, a resistor, a capacitor, or a combination thereof. Electronic dendrite electronic storage 340 can store the signal from an input event on electronic dendrite receiver 336. Electronic dendrite electronic storage 340 can have a linear response to these inputs or a non-linear, saturating response. Depending on the configuration with inductance, resistance, and capacitance, the signal can be perpetual, oscillatory, or evanescent. Electronic dendrite electronic storage 340 communicates its stored (temporally varying) signal to electronic dendrite 302 or to integrator 258.

Electronic dendrite electronic output signal 342 is generated by electronic dendrite 302. Electronic dendrite electronic output signal 342 can include electrical currents, voltages, or supercurrents. Exemplary electronic dendrite electronic output signals include electrical supercurrent circulating in a superconducting loop with a specified leak rate established by an L/r time constant and communicated to electronic dendrite or integrator through a mutual inductor. Communication between electronic dendrite electronic output signal and electronic dendrite or integrator can occur by direct wire connections or transmission lines.

Electrical interface 344 connects to dendrite 204 or an integrator. Exemplary electrical interfaces 344 include direct electrical connections by normal conductors or superconductors as well as inductive communication by mutual inductors or transformers.

Threshold control bias 346 affects the circuit of integrator 258 and can control the threshold of integrator 258. Threshold control bias 346 can be a current bias or voltage bias delivered by a normal conductor or superconductor. In an embodiment, threshold control bias 346 is a supercurrent bias delivered by a superconductor to a thresholding circuit element such as a Josephson junction or superconducting nanowire, potentially with a constriction at which thresholding will occur.

In an embodiment, a process for making fluxonic processor 200 includes a forming element of fluxonic processor 200 on a wafer, wherein devices are fabricated using micro processing fabrication techniques such as lithography, deposition, etching, cleaning, and packaging. In an embodiment, a process for making fluxonic processor 200 includes forming synapse 201 on the wafer; forming dendrite 204 on the wafer in electrical communication with synapse 201; forming neuron 205 on the wafer in electrical communication with dendrite 204; and forming transmitter 206 on the wafer in electrical communication with neuron 205. The process for making fluxonic processor 200 also can include forming waveguides on the wafer; stacking and interspersing waveguiding and superconducting device layers with cladding layers in between; disposing superconducting wiring layers for superconducting wires on or in between waveguide and superconducting photon detectors; producing photon emitters on the wafer; and packaging of devices with electrical or photonic connectivity.

Producing photon emitters includes creating a p-n or p-i-n junction in a semiconducting material such as Si, GaAs, InGaAs, or other material with similar properties. Creating junction includes implanting of dopants and annealing. Producing emitter includes making electrical contact with metals or superconductors.

Forming waveguides include depositing dielectric waveguide material and optional cladding material on the wafer. Depositing materials can be performed at a temperature from 20° C. to 400° C. using plasma-enhanced chemical vapor deposition or sputtering. Forming the waveguides also can include etching a selected shape or pattern in the deposited materials. Etching can include patterning with photolithography or electron-beam lithography followed by pattern transfer via reactive ion etching.

Superconducting photon detectors can be made in optical communication with waveguides by depositing superconducting material and can be performed at a temperature from 20° C. and 400° C. using sputtering. Etching elements can include making specific shapes and patterns in deposited materials and can include patterning with photolithography or electron-beam lithography followed by pattern transfer via reactive ion etching. Forming waveguides and superconducting photon detectors can be repeated, achieving multiple layers of waveguides and detectors, optionally with cladding layers in between. Planarizing between layers using chemical mechanical polishing can be performed.

Disposing superconducting wiring layers for superconducting wires, integrator, superconducting voltage amplifier, and the like on or in between waveguide and superconducting photon detector layers can include deposition of wire materials using sputtering or electron-beam evaporation. Patterning can include lift-off or etching lithographic techniques.

Packaging of devices with electrical or photonic connectivity can include mounting chips in packages with electrical or photonic connectivity. Making electrical or photonic connections to the devices on the chip can be performed.

According to an embodiment, a process for making neuron 201 includes forming a waveguide by lithographic patterning and etching of waveguide material; forming optoelectronic synapse receiver 318 in communication with photonic synaptic input waveguide 308 by deposition, lithographic patterning and etching of detector material on top of, adjacent to, or nearby synaptic input waveguide 308; placing optoelectronic synapse receiver 318 in communication with superconducting wire 444 by deposition, lithographic patterning and etching of superconducting wire 444 in conjunction with other circuit elements including the receiver; forming optoelectronic synapse transmission line 320 by deposition, lithographic patterning of transmission line material or Josephson junctions in a Josephson transmission line and Josephson junctions if desired; placing optoelectronic synapse transmission line 320 in communication with superconducting wire 444 by deposition, lithographic patterning and etching; forming optoelectronic synapse electronic storage 322 by deposition, lithographic patterning and etching of superconducting thin film material; placing optoelectronic synapse electronic storage 322 in communication with superconducting wire 444 and synapto-dendritic electrical connection 312 by deposition, lithographic patterning and etching of superconducting wires, including multiple layers for mutual inductors; and forming synapto-dendritic electrical connection 312 by deposition, lithographic patterning and etching of superconducting wires, potentially multiple layers for mutual inductors or transformers.

In an embodiment, a process for making dendrite 204 includes forming electronic dendrite receiver 336; placing electronic dendrite receiver 336 in communication with synapto-dendritic electrical connection 312 and superconducting wire 444 by deposition, lithographic patterning and etching of superconducting wires, including layers for mutual inductors; forming electronic dendrite electrical transmission line 338 by deposition, lithographic patterning and etching of superconducting wires and Josephson junctions where applicable; placing electronic dendrite electrical transmission line 338 in communication with superconducting wire 444 by deposition, lithographic patterning and etching of superconducting wires; forming electronic dendrite electronic storage 340 by deposition, lithographic patterning and etching of superconducting wires; placing electronic dendrite electronic storage 340 in communication with superconducting wire 444 and electrical interface 344 by deposition, lithographic patterning and etching of superconducting wires; and forming electrical interface 344 by deposition, lithographic patterning and etching of superconducting wires, and Josephson junctions where applicable.

In an embodiment, a process for making transmitter 206 or axon hillock electronic-to-photonic transducer 304 includes forming integrator 458; placing integrator 458 in communication with superconducting wire 444 and electrical interface 344 by deposition, lithographic patterning and etching of superconducting wires, and Josephson junctions where applicable; forming superconducting voltage amplifier 480 by deposition, lithographic patterning and etching of superconducting wires as well as resistive wires for the amplifier gate where applicable; placing superconducting voltage amplifier 480 in communication with superconducting wire 444 by deposition, lithographic patterning and etching of superconducting wires; forming axonic photon emitter 484 by forming a semiconductor p-n junction or p-i-n junction with optical gain embedded in a waveguide with electrical contacts; and placing axonic photon emitter 484 in communication with superconducting wire 444 and axonic waveguide 420 by lithographic patterning and etching of the structure.

Fluxonic processor 200 has numerous advantageous and unexpected benefits and uses. In an embodiment, a process for fluxonic processing of photonic synapse events with fluxonic processor 200 includes: receiving input photon 207 by synaptic receiver 220 of synapse 201; producing fluxons 229 by synaptic receiver 220; receiving fluxons 229 by synaptic Josephson isolator 225 from synaptic receiver 220; communicating fluxons from synaptic Josephson isolator 225 to synaptic integration loop 221; receiving fluxons from synaptic Josephson isolator 225 by synaptic integration loop 221; producing synaptic integrated current 228 from fluxons by synaptic coupling inductor 237; inductively coupling synaptic integrated current 228 from synaptic integrated current 228 to mutual inductor 239 of dendrite 204; receiving synaptic integrated current 228 by mutual inductor 239 from synaptic integration loop 221; producing dendrite current in dendritic receiver loop 233 from receiving synaptic integrated current 228; receiving dendritic current from dendritic receiver loop 233 by dendritic Josephson isolator 225; communicating fluxons from dendritic Josephson isolator 225 to dendritic integration loop 235 in response to receiving dendritic current; receiving fluxons from dendritic Josephson isolator 225 by dendritic integration loop 235; and producing dendritic integrated current 251 as dendrite signal 210 in response to receiving fluxons by dendritic integration loop 235 to fluxonic process receipt of input photon 207 with fluxonic processor 200.

The process for fluxonic processing further can include communicating dendrite signal 210 from dendrite 204; and receiving dendrite signal 210 from dendrite 204 by neuron 205; producing neuron signal 211 by neuron 205 in response to receiving dendrite signal 210 from dendrite 204; and communicating neuron signal 211 from neuron 205. The process can include: receiving neuron signal 211 by transmitter 206 from neuron 205; producing output photons 208 by transmitter 206 in response to receiving neuron signal 211 from neuron 205; and communicating output photons 208 from transmitter 206.

Fluxonic processor 200 and processes disclosed herein have numerous beneficial uses, including fluxonic processing for neuromorphic computing using photons as input and photons as output from fluxonic processor 200.

The articles and processes herein are illustrated further by the following Example, which is non-limiting.

EXAMPLES

Example. Fluxonic Processing of Photonic Synapse Events

Much of the information processing performed by a biological neuron occurs in the dendritic tree. For artificial neural systems using light for communication, it is advantageous to convert signals to the electronic domain at synaptic terminals, so dendritic computation can be performed with electrical circuits. The Example describes circuits based on Josephson junctions and mutual inductors that act as dendrites, processing signals from synapses receiving single-photon communication events with superconducting detectors. The Example shows circuits performing basic temporal filtering, logical operations, and nonlinear transfer functions. The Example further shows how the synaptic signal from a single photon can fan out locally in the electronic domain to enable the dendrites of the receiving neuron to process a photonic synapse event or pulse train in multiple different ways simultaneously. Such a technique makes efficient use of photons, energy, space and information.

A biological neuron is a complex information processing device, integrating signals from thousands of inputs and producing pulses when those signals reach threshold. These neuronal firing events consume the most energy of any operation performed by a neuron. To optimize spatial, temporal, and energy efficiency, the neurons receiving the signals must extract as much information as possible from each pulse. Neurons accomplish this through processing occurring in synapses and dendrites. Because neural information is based on sequences of pulses, the relevant processing involves applying temporal and logical filters to extract relevant data. For example, synapses perform temporal filtering of pulse trains to identify rising edges and to identify pulse trains exceeding some duration or number of pulses. Dendrites receive and further process synaptic signals. The operations performed by dendrites include leaky integration; logical operations; identification of coincidences and sequences between synapses from different neurons; and nonlinear thresholding transfer functions on signals from groups of synapses. Inhibitory neurons in the network can temporarily suppress the activity of a dendrite to dynamically direct attention to information of interest, thereby adapting the structural network into myriad functional networks.

Artificial hardware described here provides neural information processing. Such hardware is anticipated to be used both in the scientific study of the mechanisms of neural information processing as well as in technological applications that benefit from neuromorphic computing. Superconducting electronic circuitry performs functions associated with dendritic processing in biological systems. For hardware to be efficient for neural information processing, synaptic and dendritic operations must be efficiently manifest in constituent devices. Light is promising for communication in neural systems because it enables the fan-out and energy efficiency necessary for large neural systems, and that utilization of superconducting single-photon detectors enables communication at the lowest possible light levels.

Circuits provide superconducting optoelectronic neural information processing in which a dendritic tree extracts information about synaptic activities. A fluxonic processor is shown in FIG. 1, and elemental circuits as building blocks perform synaptic and dendritic functions as shown in FIG. 2, FIG. 3, and FIG. 4. Circuits includes synapses, dendrites, and a neuron, also referred to as a neuron cell body. These elements operate in networks of superconducting optoelectronic loop neurons.

Here, a synapse can be a circuit that receives photons with a superconducting nanowire single-photon detector and transduces the signal to an electrical current circulating in a storage loop. FIG. 2 is a circuit diagram of a synapse. A dendrite is a circuit that receives as input a signal proportional to the electrical output of synapses or dendrites, performs a transfer function on the sum of the inputs, and produces an electrical current circulating in a storage loop as the output. FIG. 3 is the circuit diagram of a dendrite. A neuron cell body receives as input a signal proportional to the electrical output of one or more synapses or dendrites, performs a threshold operation on the sum of the inputs, and produces as output a pulse of photons if the threshold is exceeded. Following the production of a pulse, the neuron cell body experiences a refractory period wherein threshold is temporarily significantly elevated, making subsequent pulses temporarily unlikely or impossible. The circuits that accomplish the thresholding and electrical-to-optical transduction can be included and are described herein or incorporated by reference. Components N and T in FIG. 1 include an analog to the cell body although it can be biologically analogous to associate transmitter T in hardware with an axon hillock of a biological neuron.

A dendrite can behave similarly to a neuron cell body in that both can perform a nonlinear threshold function on their inputs. However, dendrites and neurons are very different with respect to both physics and functions. In the context of the hardware under consideration we make the distinction that a dendrite produces an electrical output that is to be communicated locally, while a neuron cell body produces an optical output that is to be communicated to synapses that may be spatially distant. Additionally, dendrites are more appropriately conceived as nonlinear filters, with different dendrites performing different transfer functions. In contrast, all neuron cell bodies are envisioned to perform only the thresholding function leading to spike production. It follows that the outputs from dendrites are functions with analog amplitude and a continuous temporal envelope, while the outputs from neuron cell bodies are stereotypical spike events wherein the amplitude is intended to be constant across spikes and the temporal envelope is intended to approximate a delta function. The amplitude of the output from a neuron cell body carries no information, and all information output from the neuron cell body is encoded in the timing of the spikes. The flexibility to implement nonlinear transformations in the electrical domain relatively easily in comparison to optical implementations motivates these hardware design choices.

The term dendritic tree refers collectively to all the synapses and dendrites that feed into a neuron cell body. FIG. 1 shows potential complexity and diversity of the dendritic tree. The output optical signals from a neuron cell body reach downstream synapses through a network of dielectric waveguides, optical fibers, and free-space interconnects. These optical paths are collectively referred to as the axonal tree and are not shown in the schematic diagram. A neuron can be a system comprising a dendritic tree, a neuron cell body, and an axonal tree.

Functions considered in this Example include leaky integration, temporal filtering of afferent pulse trains, logical operations, detection of coincidences between activities of input neurons, inhibition, and power-law memory retention of synaptic activity. In biological systems, these functions occur through nonlinearities resulting from dendritic conductance and arbor morphology. The Josephson circuits presented here are not intended to quantitatively reproduce biological behaviors, but rather to perform logical, temporal, and nonlinear functions in the spirit of synaptic and dendritic processing. Josephson circuits are remarkably capable of these operations due to the nonlinearity established by the existence of a critical current; the avoidance of cross talk and current leakage pathways enabled by coupling through mutual inductors; and the ability to establish essentially arbitrary time constants across many orders of magnitude by choosing the inductance and resistance of current storage loops.

Time-domain circuit simulations are considered for circuits shown in FIG. 2, FIG. 3, and FIG. 4 for various configurations.

Regarding photon-to-fluxon transduction at a synapse, analysis of fluxonic processing of photonic synapse events begins with consideration of the circuit that transduces a single-photon detection event to the superconducting electronic domain in the form of a series of fluxons. The circuit that accomplishes this is shown in FIG. 2 and includes an initial receiver or transducer section, including a superconducting-nanowire single-photon detector (SPD) in parallel with a Josephson junction (JJ). In the steady state, the SPD (drawn as a variable resistor in series with an inductor) has zero resistance, and its entire bias current flows directly through it to ground. The synaptic firing junction, $J_{sf}$, is biased below its critical current ($I_c$) by the synaptic bias current, Isy. Upon absorption of a photon, the variable resistor of the SPD switches temporarily to a high-resistance state (5 k$\Omega$) for a short duration (200 ps). The current through the SPD is diverted across a resistor (Ispd across rspd in FIG. 2) and to $J_{sf}$. The sum of currents across $J_{sf}$ exceeds $I_c$, and the junction produces a series of fluxons. These fluxons propagate along the Josephson transmission line and are stored in the synaptic integration (SI) loop. The Josephson transmission line serves to isolate the activity of the receiver portion of the circuit from the integration loop, allowing their circuit parameters to be optimized independently. After the 200 ps photon detection event, the bias current returns to the SPD with the time constant of $\tau spd=Lspd/rspd$. This time constant has a minimum functional value determined by the electro-thermal properties of the nanowire, and throughout this work this time constant is fixed at $\tau si=10$ ns, and the bias to the SPD is fixed at 10 µA. The number of fluxons created during a synaptic firing event depends on the net current across Jsf as well as the duration during which Jsf is biased above Ic. With $\tau si$ and the bias to the SPD fixed, the number of fluxons, and thus the synaptic weight, are dynamically adaptable by changing the synaptic bias current, $I_{sy}$.

The temporal activity of the circuit in FIG. 2 during a synaptic firing event is shown in FIG. 11(a). WRSpice simulated all circuits. JJs had Ic=40 µA and $\beta c$=0.95. The left-most top trace in FIG. 11(a) shows the current diverted from the SPD after a photon has been received. The blue trace shows the voltage pulses as the fluxons enter the SI loop. As each fluxon enters the loop, it introduces a discrete, fixed value of current given by $I_\varphi=\Phi_0/L_{si}$, where $\Phi_0 \approx 2\times 10^{-15}$ Wb is the magnetic flux quantum, and $L_{si}$ is the inductance of the synaptic integration loop. We assume the value of $L_{si}$ is chosen by design independently for each synapse and set in hardware at the time of fabrication. The stepped trace in FIG. 11(a) shows the increase in current as the fluxons enter the SI loop during a synaptic firing event. The discrete steps with each fluxon are evident, and the total amount of current added to the SI loop during a synaptic firing event depends on both the number of fluxons generated during the firing event (controlled dynamically by Isy) and the inductance of the SI loop (set in hardware as Lsi).

A role of Isy is to adapt the synaptic weight by changing the number of fluxons generated during a synaptic firing event. FIG. 11(b) shows several fluxons generated during a synaptic firing event as a function of Isy. The fit shows close agreement with a quadratic function. This method of establishing and adapting the synaptic weight has several properties. First, it is slowly varying, so small changes in Isy result in small changes in the synaptic weight. Second, the function is monotonic, so increases in Isy always result in increased synaptic efficacy, while decreases in Isy always result in decreases in synaptic efficacy. This enables activity-based plasticity mechanisms. Third, the bias Isy can be bounded so synaptic strength does not exceed a certain limit, and runaway activity does not occur. Finally, the integer number of fluxons generated can be made to cover a broad range so that analog synapses of relatively high bit depth can be achieved. FIG. 11(b) shows that over eight bits (256 levels) can be utilized, and throughout this work we find the range of eight to 10 bits to be a comfortable working range for the circuits under consideration. This is much lower than the 64-bit processors used for high-arithmetic-depth numerical calculations. Yet neural computation benefits from performing lower-resolution operations with high efficiency; accuracy is achieved through redundancy and parallelism. Additionally, effects of noise due to operation at finite temperature will further reduce the ability to resolve distinct synaptic weight values. The effects of this noise will be investigated in future work.

Figure 11:
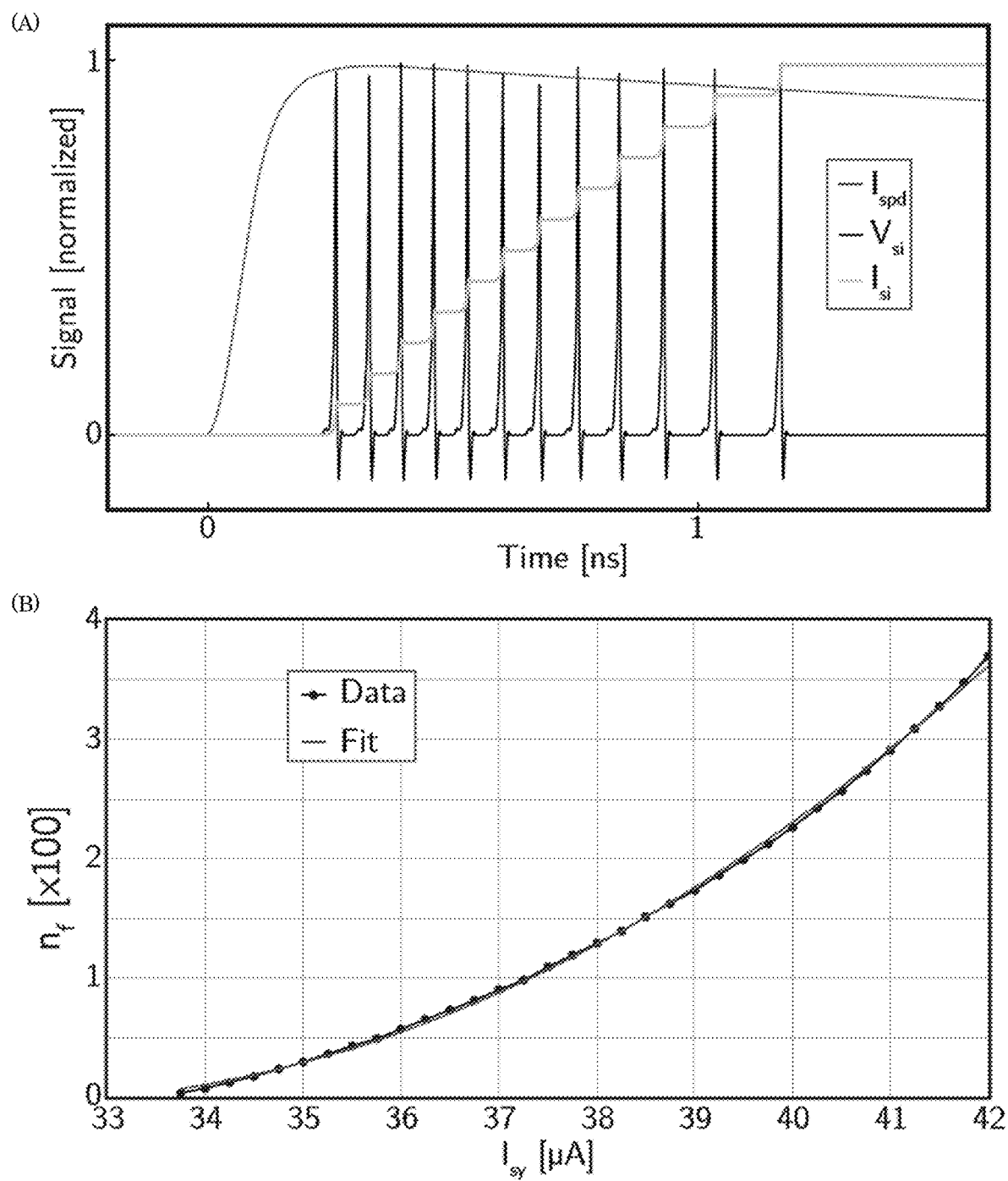
FIG. 11 shows an operation of the photon-to-fluxon synaptic transducer. (a) Temporal activity of the circuit in FIG. 2(a) during a synaptic firing event. The traces are for the currents and voltages labeled in FIG. 2(a), and all traces were independently normalized for display on the same plot. (b) Demonstration of variable synaptic weight. The number of fluxons generated during a synaptic firing event ($n_f$) is plotted as a function of the synaptic bias current ($I_{sy}$). A fit to a second-order polynomial is also shown.

With reference to FIG. 11, it is contemplated that manufacturability of circuits can be made for large-scale systems capable of advanced cognitive computing. Such systems can include billions of synapses and 10 times as many JJs. These JJs have a statistical distribution of critical currents due to fabrication variations. During operation, the biases delivered to the junctions will also have a statistical distribution. The data in FIG. 11(b) show that synapses with a broad range of bias conditions contribute signal upon receiving synaptic events, and synapses are operational if bias current varies by 8 µA around 38 µA, giving a margin of 20%. When the system is fabricated and turned on, variations in junction critical currents and biases will result in a statistical distribution of synaptic weights. Over time, as the system operates and learns, these bias currents will be finely adjusted based on the activity-dependent plasticity mechanisms, mitigating any deleterious effects of fabrication variations.

After a photonic communication event has been detected, the synaptic weight has been set as the number of fluxons created, and current has been added to the SI loop, further processing ensues. The electrical current generated by the synapse event can be stored for a chosen amount of time. This is determined by the leak rate of the SI loop, selected by design and set in hardware with the time constant $\tau si=Lsi/rsi$. Note that $\tau Si$ is entirely independent of $\tau spd$, and because we consider superconducting circuits, memory of a synaptic event can persist indefinitely. Also note that while the amount of current added to the SI loop during a synaptic firing event depends on Lsi, rsi can be chosen independently from Lsi, thereby enabling the amount of current and its storage time to be separately selected. The current can be released quickly, on the order of the SPD reset time of 10 ns, or it can be stored 10 or 100 times longer to retain a memory of the event for as long as required. In this work we mainly consider decay times spanning two orders of magnitude, from $\tau si=10$ ns to $\tau si=1$ µs.

In biological neural systems, processing among local clusters of neurons occurs primarily through fast activity in the range of gamma frequencies (30 Hz-80 Hz). This frequency range emerges because it reaches the upper limit of speed for the excitatory pyramidal neurons participating in the activity. In the superconducting optoelectronic hardware under consideration, this upper speed limit is in the tens of megahertz, limited by the reset time of the SPDs in the synapses and of the transmitter circuits that generate neuronal firing events. Here we take the upper firing rate to be 100 MHz for numerical simplicity. Therefore, we expect the neurons under consideration to demonstrate behavior like gamma oscillations, bursting with inter-spike intervals on the order of 10 ns. Similarly, biological neural systems process information across the network through slower activity at theta frequencies (4 Hz-8 Hz). Mapping this scaling onto the system under consideration, gamma oscillations occur at 100 MHz as well as theta oscillations occurring at 10 MHz. Moreover, $\tau si$ can range from 10 ns to 1 µs and spike trains can be in from 50 MHz to 100 MHz range.

Figure 12:
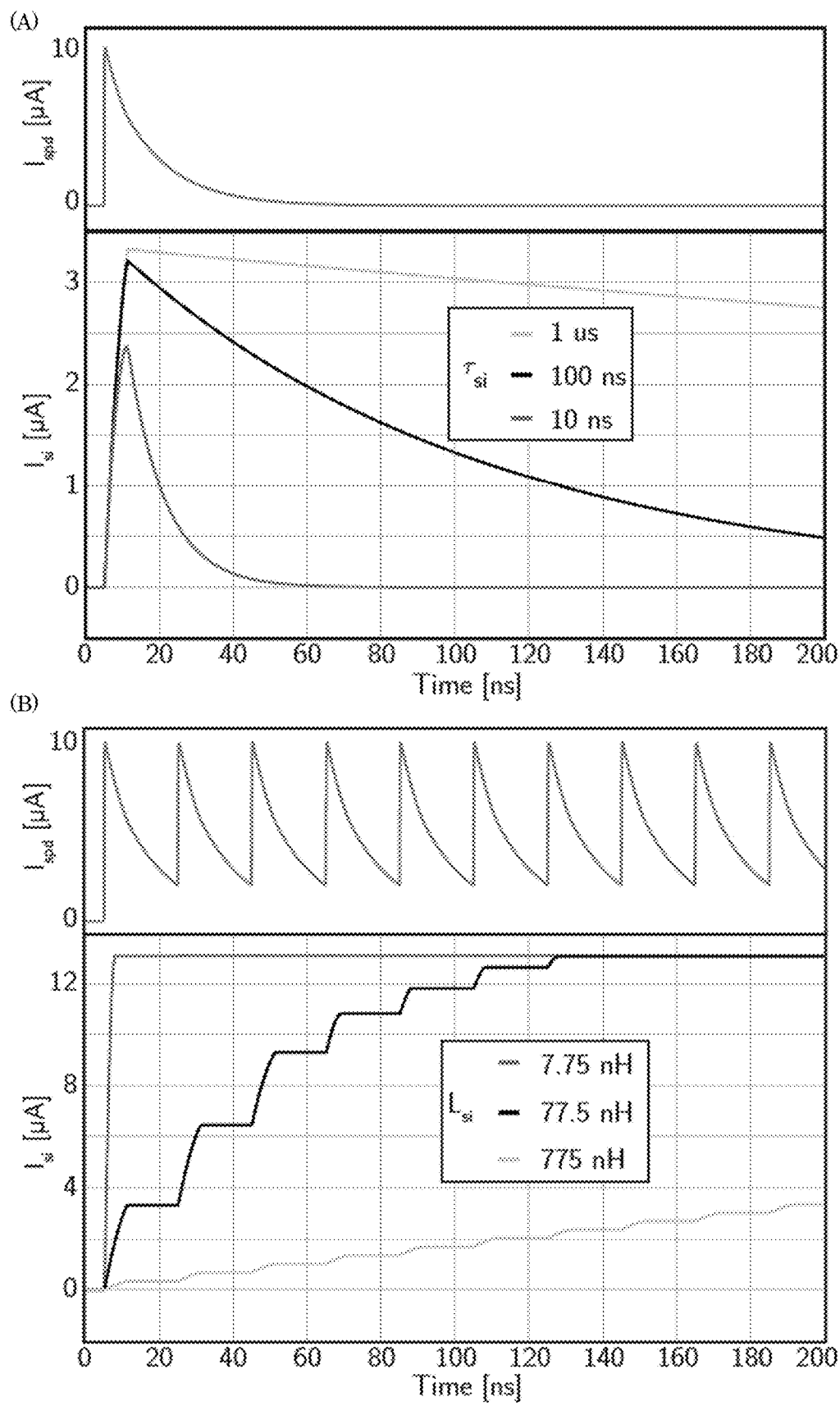
FIG. 12 shows filling of the SI loop in response to a pulse train. The upper panel shows the current pulses generated by detection events at the SPD. The lower panel shows time traces of $I_{si}$. Here $\tau_{si}=\infty$ to focus attention on the way the SI loop fills with current, rather than how it decays. A loop with small inductance ($L_{si}$=7.75 nH) will saturate after a single photon detection event, while a loop with large inductance ($L_{si}$=775 nH) can store the signals from many synaptic firing events.

In addition to signal decay from a synaptic integration loop, consider saturation, as shown in FIG. 12. Current associated with a fluxon being generated in a loop of inductance L is $I_\varphi=\Phi 0/L$. This current circulates in the direction opposing the applied bias to the JJ. The number of fluxons that can enter the loop before the cumulative opposing bias equals Ic is given by $Ic/I_\varphi=LIc/\Phi 0=\beta L/2\pi$, where $\beta L$ is a common parameter quantifying the flux storage capacity of a superconducting loop. $\beta L/2\pi$ gives an estimate for how many fluxons a given SI loop will be able to store before saturation, and the exact number also depends on the applied bias. FIG. 12 shows integrated current in an SI loop as a function of time in response to a periodic train of pulses with 20 ns inter-spike interval. Here we fix $\tau si=\infty$ and vary the inductance of the loop. In these simulations, the value of Isy was fixed at 38 µA, so 129 flux quanta (>27) are generated during each synaptic firing event until the loop nears saturation, at which point the effective synaptic weight is suppressed, demonstrating a simple form of short-term plasticity. With a small value of Lsi, the quantity $\beta L/2\pi=LsiIc/\Phi 0=150$, and the loop saturates after a single synaptic firing event. With an intermediate value of Lsi=77.5 nH, $\beta L/2\pi=1.5\times 10^3$, and seven synaptic firing events fill the loop. With a large value of Lsi=775 nH, $\beta L/2\pi=1.5\times 10^4$, and the loop can hold the activity from nearly 100 synaptic firing events with this value of Isy. All these values of inductance are straightforward to achieve with high-kinetic-inductance materials. Note that in digital superconducting electronics $\beta L/2\pi=1.5$, so a loop can hold a single fluxon to represent a bit. FIG. 12 shows the control one has in design over the capacity of the SI loop. The loop can operate as a binary device switching from a low to high state with each synapse event, or it can act as an analog device capable of representing many synapse events with distinct values of current. This saturation is a simple form of nonlinearity present in the synapse.

Figure 13:
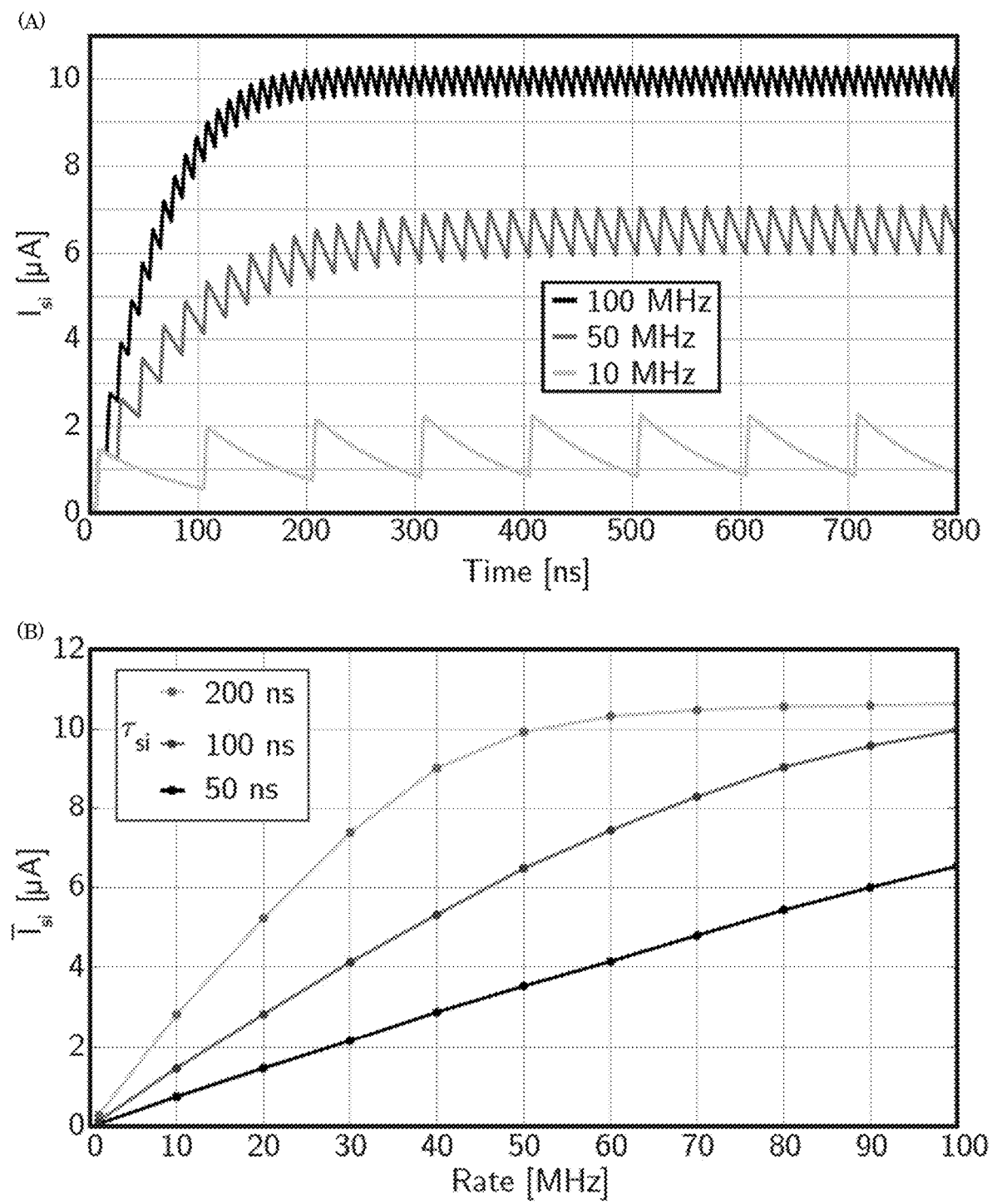
FIG. 13 shows rate-to-current conversion at a synaptic transducer. (a) Isi as a function of time as pulse trains of various frequencies are incident upon the synapse. (b) Systematic analysis of rate-to-current mapping for SI loops of three decay time constants. To obtain these curves, temporal traces like those of (a) have been analyzed once the steady state has been reached. Each data point in (b) results from time-averaging a trace such as those in (a) over a single inter-spike interval: $I_{si}$=(t2-t1)-1∫t2t1$I_{si}$(t)dt, where t1 and t2 are arrival times of consecutive photons at the synapse after the steady state has been reached.

About operations on pulse trains at a single synapse, one form of processing can be performed using the synaptic circuit of FIG. 2, and FIG. 13 shows operation of rate-to-current conversion. The first term of the Volterra expansion of a spike train corresponds to the time-averaged spike rate so a neuron can decode this information. This can be accomplished with the synaptic transducer of FIG. 2 when the SI loop is given a leak rate, as discussed above. The circuit behaves as a standard leaky integrator modeled as $I'si=\alpha-Isi/\tau si$, where a is the rate of current added to the SI loop by synaptic firing events. The leaky integrator model has the steady-state solution $Isi=\alpha\tau si$, indicating that the current in the loop is proportional to the rate of input spikes. In FIG. 13(a) we show temporal traces of the current Isi in the presence of afferent activity at various rates for a loop with $\tau si=100$ ns and Lsi=77.5 nH, and the time-averaged value of Isi reaches steady-state. In FIG. 13(b) we show the time-averaged current, $\bar{I}si$, as a function of the synaptic firing rate for three values of $\tau si$. With the value $\tau si=50$ ns, the response is linear across the entire range of gamma and theta frequencies. Linear rate-to-current conversion holds if the integration time of the loop is short enough to avoid saturation, that is, $\alpha\tau si < Isatsi$. With $\tau si=200$ ns, the loop reaches saturation, and higher input frequencies do not code unique information. If linear operation is desired, one can select the time constant of the loop to be commensurate with the frequencies to be detected, or if nonlinear saturation is desired, longer integration times can be utilized. If increased dynamic range is advantageous, one can utilize the splitter of FIG. 4 to activate multiple SI loops with different time constants from the same photonic synapse.

The synaptic transducer and SI loop of FIG. 2 provides rate-to-current conversion of rate-coded neuronal information. When Isi is coupled to the circuit of FIG. 3 through a mutual inductor, more functionality can be achieved. In FIG. 3, which we refer to as a dendritic processing circuit or dendrite, dendritic processing circuit receives input, and the dendrite receives input as flux coupled through mutual inductors. In the steady state, all junctions are biased below Ic. Afferent input to the dendritic receiving (DR) loop from one or more SI loops during a time window established by the synaptic time constants, $\tau si$, increases the bias to the dendritic firing junction (Jdf). When the net bias to Jdf exceeds Ic, one or more fluxons will be produced, they will traverse the JTL, and they will add flux to the dendritic integration (DI) loop, just as in the case of the synapse. The role of the dendritic reset junction (Jdr) is to release the flux generated by Jdf from the DR loop, thereby resetting the loop to the state prior to firing. The signal integrated in the DI loop is coupled either to the DR loop of another dendrite or the neuronal receiving (NR) loop of the neuron cell body.

The use of mutual inductors is advantageous for coupling multiple synapses to a single dendrite because mutual inductors reduce cross talk between synapses to a very low level. In general, SI loops have a self-inductance of at least 1 nH, and possibly up to 10 µH. The mutual inductors considered here are asymmetric with the inductor in the SI loop being on the order of 100 pH and the coupled inductor in the DR loop being on the order of 10 pH. The total inductance of the DR loop is on the order of 100 pH. Thus, when current is circulating in one SI loop, appreciable current is coupled to the DR loop, while the parasitic current coupled into other SI loops is significantly smaller. Using typical numbers from the circuits studied in this work, the parasitic current coupled to an adjacent SI loop is roughly one thousandth the current induced in the DR loop, with Idr being on the order of microamps. More generally, in the limit that Lsi>>Msy, this induced current scales as Msy/(NsyLsi), where Nsy is the number of synaptic loops coupled to the DR loop. For typical values of Msy and Lsi, this quantity is on the order of 10-3 for Nsy=1 and decreases as synapses are added to the loop. The ratio of parasitic current induced in adjacent SI loops to the intended current induced in the DR loop is independent of Nsy, and in the same limit of Lsi>>Msy we find this ratio is $M_{si}/L_{si}$, which again is on the order of 10-3 for typical circuit parameters.

The dendritic circuit is subjected biasing conditions and in a presence of operation of $J_{df}$ and $J_{dr}$. If the biases are established such that when $J_{df}$ produces a fluxon, the current added to Jdr is insufficient to switch $J_{dr}$ until the added biases from the SI loop(s) decay, the device acts like a DC-to-SFQ converter. Jdf will produce exactly one fluxon, and the DR loop will then be inactivated until the counter bias across Jdr due to the SI loop(s) decays, at which point Jdr will produce a fluxon countering the one produced by Jdf, and the loop will be reset. In this configuration, the dendritic receiver has a binary character.

The circuit can also operate in an analog mode, wherein the dendrite can produce a continuous stream of fluxons, much like the synaptic transducer. To achieve this operation, Jdr is biased closer to Ic so that a fluxon generated by Jdf is enough to switch Jdr. Thus, each time Jdf produces a fluxon, it is rapidly canceled by Jdr, and the DR loop is reset with no net flux. Jdf will continue to produce fluxons if it is held above Ic, and in the presence of synaptic activation (current in one or more SI loops), a stream of fluxons will be generated by Jdf and stored in the DI loop. This stream may contain many fluxons until the DI loop saturates, so we consider this an analog mode of operation.

Whether operating in binary or analog, the effect of the dendrite is to perform a nonlinear transfer function on its inputs and provide the output signal to the DI loop in the form of supercurrent. Just as in the SI loop, the DI loop can be configured to saturate rapidly (small $\beta L$) or store the signal from many threshold events (large $\beta L$), and the loop can be configured with a decay time constant ($\tau di=Ldi/rdi$) spanning a broad range, from time scales shorter than a gamma interspike interval to as long as superconductivity can be maintained. With these basic operating principles in mind, we proceed to consider examples of dendritic processing with this circuit.

Operations usually associated with synaptic computation include short-term-facilitating and short-term-depressing plasticity. Some synapses are observed to provide no response or very weak response to the first pulse of a train, with the efficacy of the synapse increasing as the pulse train proceeds. This behavior is referred to as short-term-facilitating plasticity, and it can be due to dynamics within the synapse itself or to the conductance properties of a dendrite or series of dendritic compartments. Here we simulate analogous behavior with a single synaptic transduce (FIG. 2) coupled to a single dendritic processing circuit (FIG. 3).

Figure 14:
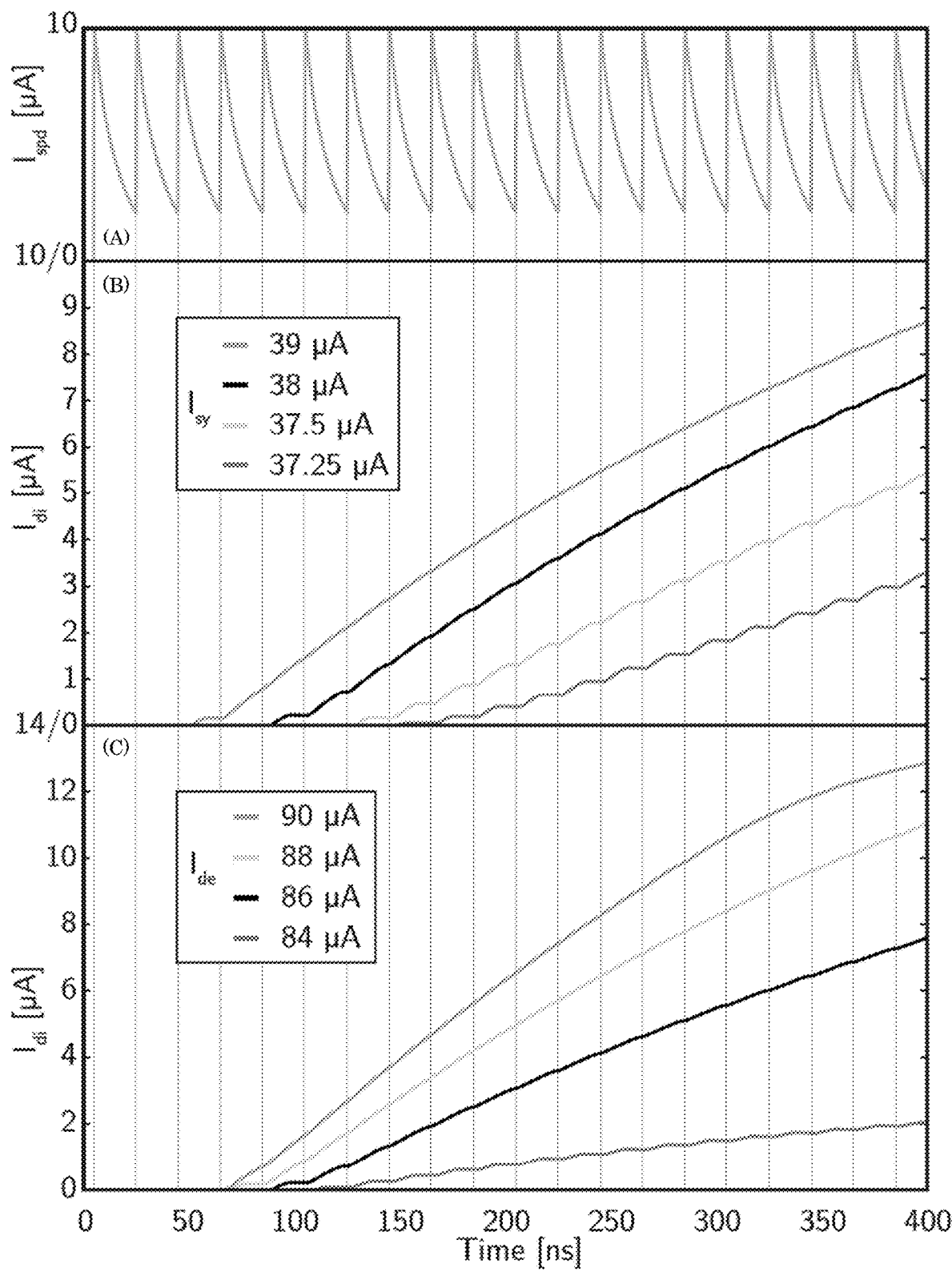
FIG. 14 shows short-term-facilitating plasticity. With a single synapse coupled to a dendrite, a nonlinearity can be induced wherein multiple synaptic firing events are required to generate a signal. (a) The afferent pulse train. (b) The current in the DI loop, $I_{di}$, as a function of time for several values of the synaptic bias current, $I_{sy}$. (c) Idi for several values of the dendritic bias current, $I_{de}$. The blue curve is the same in (b) and (c). The vertical lines spanning (a)-(c) represent the times of the synaptic firing events.

To achieve short-term-facilitating plasticity, we design an SI loop that can store the signals from multiple synaptic firing events before saturation, and we bias Jeff so that the additional current induced by the first few synaptic firing events does not push the junction over Ic, but after multiple synaptic firing events, Ic is exceeded and flux is added to the DI loop. We design the dendrite in analog mode for this behavior. Circuit simulations of short-term-facilitating plasticity are shown in FIG. 14. FIG. 14(*a*) shows the afferent pulse train. The first pulse occurs at 5 ns, and the interspike interval is 20 ns. FIG. 14(*b*) and FIG. 14(*c*) show the accumulated current in the DI loop as a function of time. In FIG. 14(*b*) the effect of the synaptic bias current, Isy is shown. The primary effect of the dynamically reconfigurable bias current is to shift the curve left or right. With a stronger synaptic weight, more current will be added to the SI loop with each synaptic firing event, and therefore more current will be induced by the mutual inductor into the DR loop. Thus, fewer synaptic firing events are involved to reach threshold in the dendritic compartment. In this example, Isy can shift the threshold from three to eight synaptic firing events. In FIG. 14(*c*), the synaptic bias current is fixed at 38 µA, while the dendritic bias current, Ide, is varied. Change in Ide has less of an effect on the number of pulses required to reach threshold, but it significantly affects the number of fluxons generated by Jdf each time a synaptic firing event occurs, which is related to the slope of the traces in FIG. 14(*c*). The effect of the dendritic bias current, Ide, is therefore analogous to the effect of the synaptic bias current, Isy, during a synaptic firing event. We therefore anticipate that Ide will provide a dynamically reconfigurable circuit parameter that can be used to establish a "dendritic weight" and can be used for long-term plasticity and learning.

As mentioned above in the context of synapses, fabrication imperfections in JJ critical currents as well as variations in bias conditions can affect dendritic circuit operation. The data in FIG. 14 show that the dendritic response is quantitatively sensitive to the value of the bias currents, or similarly the junction critical current. However, the qualitative nature of the response is consistent across a useful range of operating parameters. In large-scale systems, the intention is not to precisely control the response of each dendrite or synapse quantitatively at the time of fabrication, but rather to fabricate a complex network with a statistical distribution of device parameters and to employ adaptive plasticity functions that finely adjust biasing conditions through activity-dependent feedback, to adapt the circuits to operating points useful for network computation. Such adaptation over time through synaptic and dendritic plasticity are in the spirit of biological neural systems that cannot be constructed with specific values for each synaptic weight or precise dendritic morphology.

Figure 15:
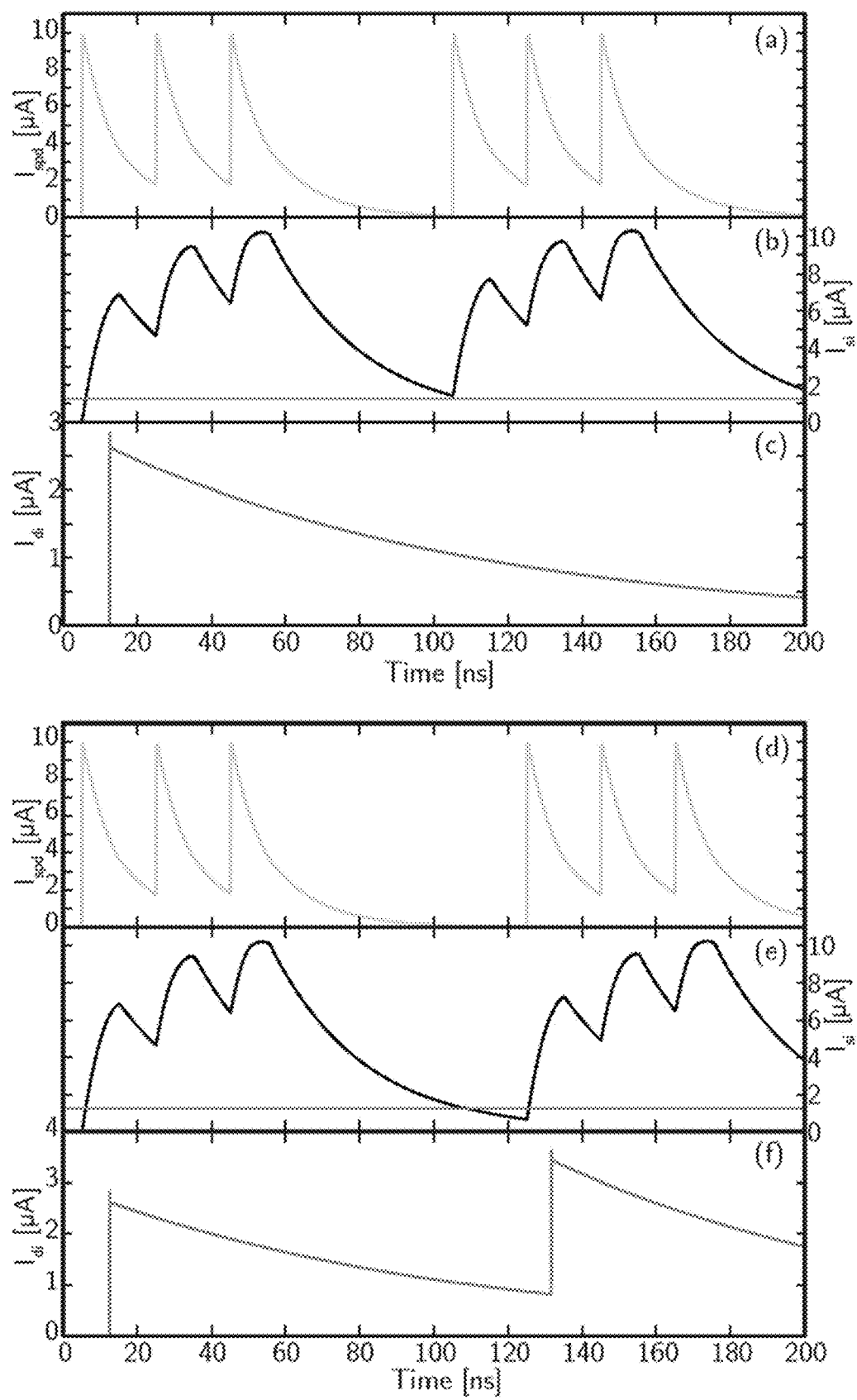
FIG. 15 shows short-term-depressing plasticity. With a single synapse coupled to a dendrite, the first pulse of a train can generate signal in the DI loop, and the response of the synapse is depressed for subsequent pulses until the signal in the SI loop decays below a certain level, resulting in reset. (a) Afferent activity. (b) The resulting signal in the SI loop. The line shows the reset level, which is not quite reached before the second series of three pulses occurs. (c) The signal in the DI loop, $I_{di}$. Only a single pulse enters the DI loop because the break between the pulse trains was not long enough to achieve reset. (d) Afferent activity with a slightly longer delay between the two pulse trains. (e) The signal in the SI loop, dropping briefly below the reset threshold. (f) The resulting current, $I_{di}$, showing two pulses generated as the dendrite recognized these as two separate pulse trains.

While facilitating behavior effectively strengthens a synapse as a pulse train proceeds, short-term-depressing plasticity gives the opposite behavior. In an extreme form, this mechanism can be used to convey only the onset of a pulse train, while blocking subsequent spikes. To demonstrate this behavior, we consider the dendritic processing circuit in binary mode. Circuit simulations are shown in FIG. 15. Consider first the upper panel, FIG. 15($a$-$c$). The current pulses from the SPD due to the afferent spike train are shown in FIG. 15($a$), and the resulting current in the SI loop is shown in FIG. 15($b$). The activity consists of two groups of three spikes. The current in the DI loop is shown in FIG. 15($c$). A single pulse enters the DI loop at the onset of the first spike in the train. In FIG. 15($b$), we have marked with a red line the value of Isi below which reset occurs in the DR loop. We see that the first spike of the second group of three occurs just before Isi drops below the reset value. The second group of pulses is not identified as a new spike train, so no additional signal is added, and Idi continues decaying with τdi. By contrast, in the lower panel (FIG. 15($d$-$f$)), the onset of the second group of pulses occurs 20 ns later than in the upper panel, giving the current in the SI loop (and therefore the DR loop) time to decay below the reset value. In this case, when the second group of pulses begins, it is identified as a new train, and additional signal is added to the DI loop, again in the form of a single fluxon. The reset delay can be established in hardware across a broad range of values through τsi and can be adjusted over a smaller range dynamically through Ide. The dendritic receiving loop does not have any resistance of its own, so the current decay time constants in that loop are entirely determined by the SI loops.

While we refer to this operation of the dendritic processing circuit as binary, this term refers to the all-or-nothing response of the DR loop. The DI loop may be independently configured to store anywhere from one to many fluxons, so the output of the circuit can be chosen independently to represent either a binary signal or to give an analog representation of the number of afferent pulse trains occurring within a time period set by τdi. If the DI loop is configured with large βL and τdi on the order of theta time scales, the dendrite will keep track of how many gamma-frequency pulse trains have occurred, thereby keeping track of oscillations on theta time scales. Because the maximum signal level in the DI loop can be made the same as in an SI or DI loop keeping track of gamma activity, such dendritic processing can represent gamma and theta information with equal weight. Alternatively, using the same circuit configuration except employing an SI loop with a time constant close to τspd will cause the DI loop to receive a single fluxon each time the synapse receives a photon. In this mode of operation, the circuit achieves single-photon-to-single-fluxon transduction, converting each photon detection event to an identical, binary signal. If synaptic weighting is not required, and dendritic weights alone can suffice, the signal from a photon-detection event can immediately be converted to a single fluxon, and energy efficiency can be gained.

The synaptic firing circuit can accomplish rate-to-current conversion, reporting a temporal average of recent activity. By coupling the synaptic firing circuit to a dendritic processing circuit, we can construct a dendrite that generates signal only when a pulse train persists for a certain duration. We can use the same circuits with slightly different biasing configuration to construct a dendrite that generates signal only when a pulse train begins after a certain period of rest. All these operations correspond to temporal filters performed on spike trains occurring at a single synapse. Dendritic processing identifies coincidences and sequences between the activities of multiple neurons.

Figure 16:
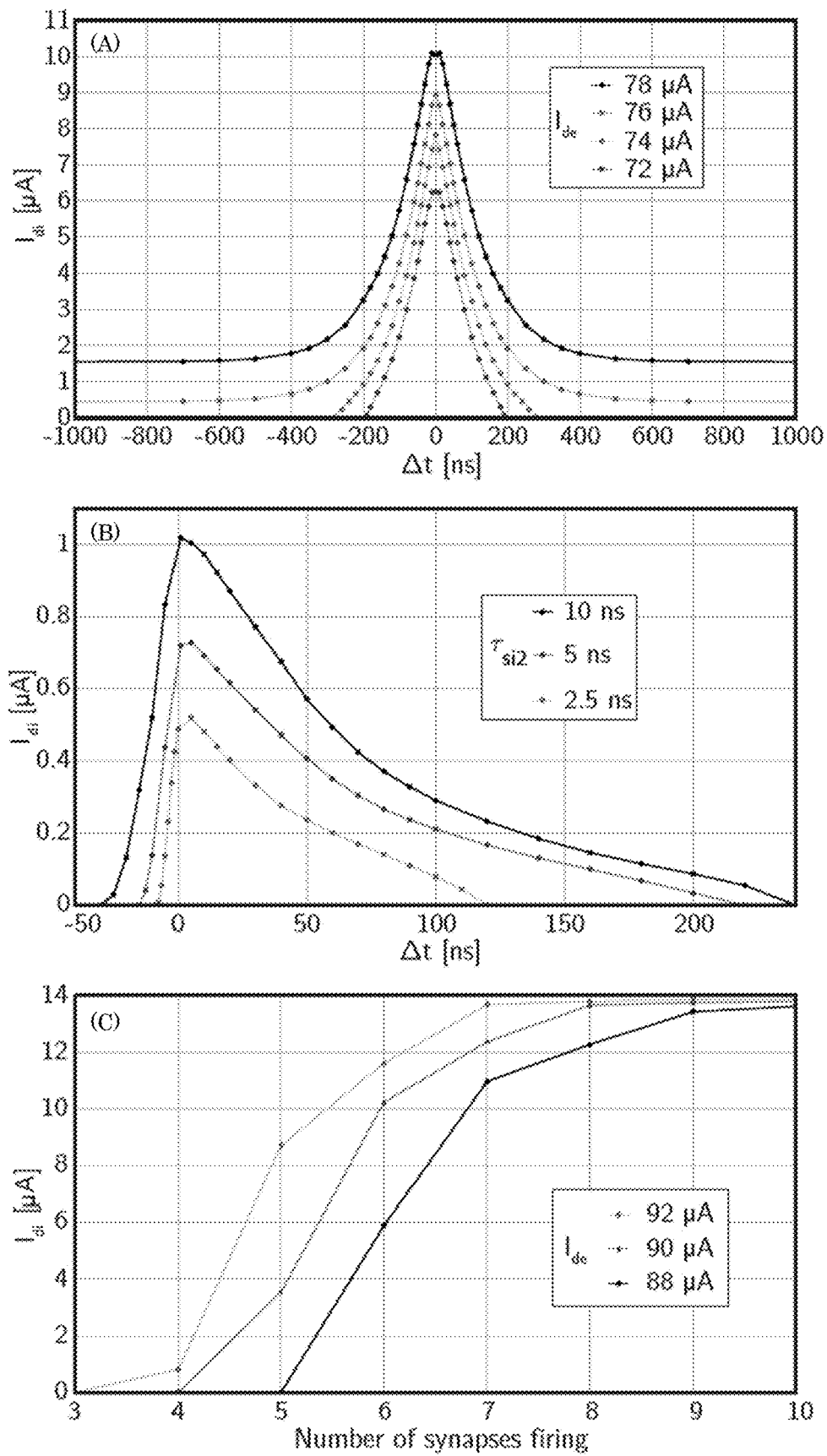
FIG. 16 shows multiple synapses from different neurons coupled to a single DI loop. (a) Two synapses with the same time constant. The current induced in the DI loop (Idi) is plotted as a function of the time between the two synapse events (Δt) for four values of the dendritic bias current (Ide). (b) Two synapses with significantly different time constants. Idi is plotted versus Δt for three values of the fast synaptic time constant ($\tau_{si}^2$). (c) Ten synapses from different neurons coupled to a single DI loop. The current generated in the DI loop is plotted as a function of the number of synapses firing simultaneously for three values of the dendritic bias current, Ide.

About detecting coincidences between neurons, the second term in a Volterra expansion of the activities of two neurons corresponds to coincidences between the two neurons. We can use the same dendritic processing circuit of FIG. 3($b$) to detect coincidences, provided two SI loops are coupled to the DR loop through mutual inductors. In the simplest case, we wish to know whether two synapses have fired within a certain time period of each other. This can be achieved by giving both SI loops the same value of τsi. The response of such a circuit is shown in FIG. 16($a$), where the current induced in the DI loop is shown as a function of the time delay between the two synaptic firing events for several values of Ide with τsi=100 ns. For the two lower values of Ide, the circuit can be thought of as an AND gate with an analog extension to the time domain: if synapse i AND synapse j fire within a time period set by τsi, a signal dependent on the time difference is added to the DI loop. For larger values of Ide, the circuit performs an OR operation, because for arbitrarily large Δt, the current in one SI loop alone is enough to switch Jdf and generate some signal in the DI loop. A similar coincidence detection circuit was proposed in based on two SPDs. The advantage of the circuit presented here is that the computation occurs in the electronic domain, bringing the advantage of energy efficiency as well as the ability to perform multiple dendritic operations simultaneously using fluxonic pulse splitters.

The dendritic tree may benefit from the ability to detect not just coincidences, but also the specific sequence in which synapse events occurred. This can be achieved by breaking the symmetry between the two synapses with τsi1>>τsi2. We consider this scenario in FIG. 16($b$). Here, τsi1 is still 100 ns, but τsi2 is much shorter (2.5 ns-10 ns), and we again plot the current added to the DI loop as a function of Δt=t2−t1, where ti is the time of a synapse event on synapse i. In this case, the response function is skewed toward Δt>0. It is probable that any current induced in the DI loop is due to an event on synapse one followed by an event on synapse two. Yet with this design, the contribution from Δt<0 does not vanish completely. We have plotted the response for three values of τsi2. We see that as we decrease τsi2, the error due to current added when Δt<0 decreases as τsi2 decreases. Thus, we can tighten the timing tolerance by decreasing τsi2. With τsi2=2.5 ns, errors do not occur if t2 is prior to t1 by 8 ns, less than the interspike interval of a gamma sequence, rendering this circuit capable of providing reliable information regarding the temporal order of activity between two synapses.

The coincidence and sequence operations of the dendritic processing circuit provide information regarding activity at two synapses. Devices herein can extend this to perform nonlinear operations on groups of multiple synapses and can be achieved by coupling multiple synapses to a single dendrite, using the same circuits we have been discussing so far. In FIG. 16(c) we show the value of Ide resulting from a variable number of synapses firing simultaneously, with 10 total synapses coupled to a DR loop. We have chosen the circuit parameters so the bias added to Jdf by a single synapse event is insufficient to exceed Ic. The transfer function of the circuit is highly nonlinear, approximating a sigmoidal activation function. Thus, the current generated in the DI loop is not the sum of independent SI currents. The threshold number of active synapses can be set in design across a broad range, and as the three traces reveal, this number can be dynamically adjusted with Ide. In both FIG. 16(a) and FIG. 16(c) we see that Ide can be used in a manner analogous to the synaptic bias current, pointing again to the potential for reconfigurable efficacy and learning. While FIG. 16(c) includes simultaneous synaptic activity, the true response of the dendrite would convolve the temporal responses of the constituent synapses. Similar principles to those demonstrated in FIG. 16(a) and FIG. 16(b) shape the net dendritic contribution.

Operations discussed in this Example thus far were excitatory. Inhibition of the dendritic response is considered next. About inhibition and rapid query, the dendritic tree offers information to the neuron when it can be dynamically adapted into diverse functional networks. Inhibition can enable such adaptation (as well as many additional functions) by temporarily silencing specific dendrites or entire branches of the dendritic tree. To accomplish this with the dendritic processing circuit under consideration, we couple an additional loop to the DR, except with mutual inductor of reverse coupling to oppose the bias to Jdf. We refer to this as an inhibitory (IH) loop, as shown in FIG. 3(b). The circuit parameters can be chosen so that following a synaptic event on the inhibitory synapse no amount of activity on the excitatory synapses can drive Jdf above Ic. As discussed above, the AND/OR logical operations become coincidence detections when extended to the time domain, and when the previously considered AND circuit is augmented with an inhibitory input, the logical operation becomes AND-NOT.

Figure 17:
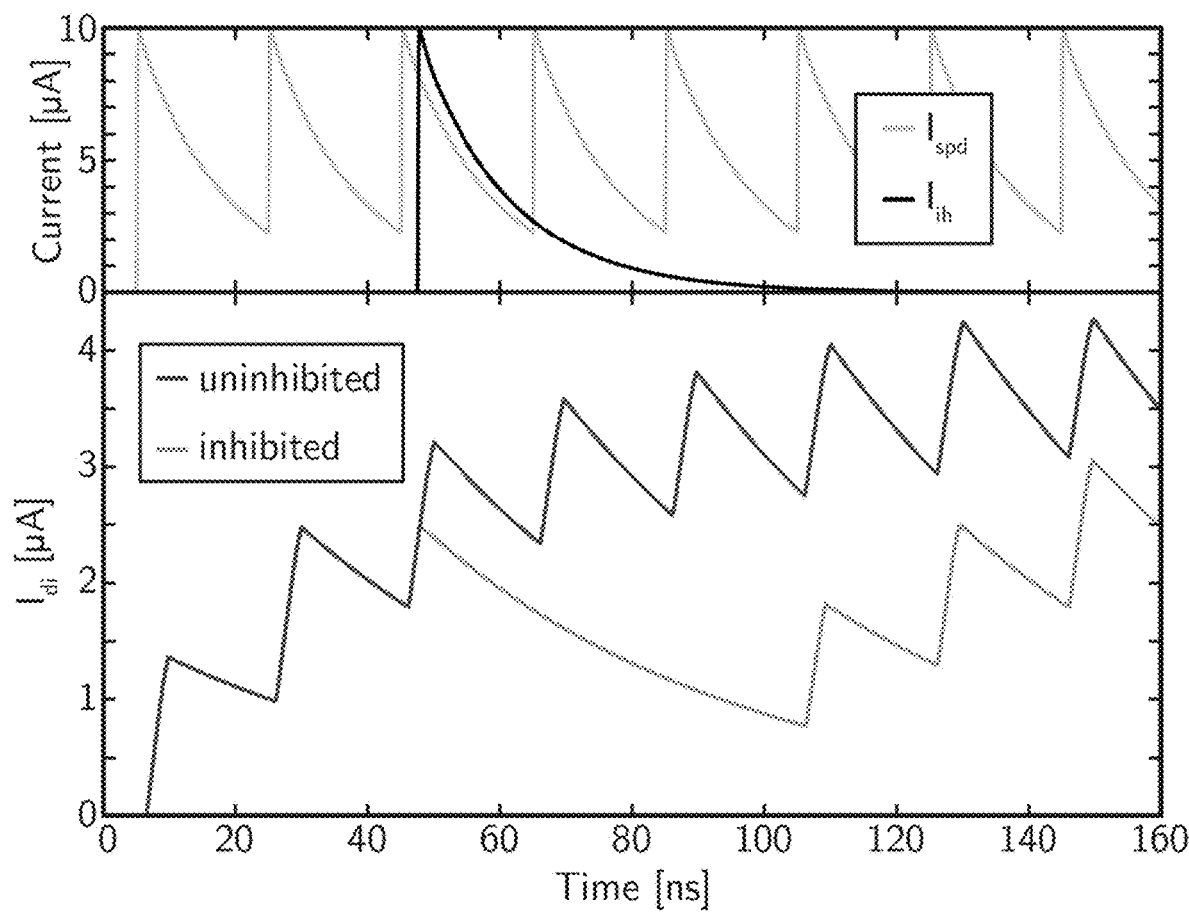
FIG. 17 shows the effect of inhibition. A single excitatory synapse and a single inhibitory synapse are coupled to a DR loop. The upper panel shows the signal from an afferent pulse train as well as the single inhibitory pulse. The lower panel shows the current generated in the DI loop ($I_{di}$) with and without the inhibitory pulse. In this example, the circuit has been configured so that following the inhibitory pulse, no amount of activity on the excitatory synapse can drive $J_{df}$ above $I_c$, and the dendrite is completely suppressed until the signal in the IH loop has decayed.

Simulated operation of a dendrite with a single excitatory and single inhibitory synapse is shown in FIG. 17. The upper panel shows a temporal trace of excitatory activity, which consists of a pulse train at 50 MHz. A single inhibitory synapse event occurs shortly after the third pulse of the excitatory train. The lower panel shows the current circulating in the DI loop as a function of time for cases with and without the inhibitory synapse event. Without inhibition, current is added to and decays from the DI loop, as expected. When inhibition occurs, the effect of excitation is immediately quenched. Following the inhibitory synapse event, Idi begins decaying with time constant τdi. Inhibition decays with a completely independent time constant, τih=Lih/rih, just as all other loops discussed thus far. When the inhibitory current has decayed sufficiently, the effect of the excitatory pulse train resumes.

The duration over which the dendrite is inhibited is controlled by τih, and for the network to be rapidly adaptable under the influence of inhibition, this time constant will be as short as a gamma-range interspike interval. If inhibition is required over theta time scales, repeated activity on the inhibitory neuron can keep the dendrite suppressed. However, this may not be the most energy-efficient mode of operation. Given the circuits under consideration, we can utilize a mode of operation complimentary to inhibition. In this configuration, the mutual inductors and bias to the DR loop are chosen so that even with all afferent SI loops saturated, the current across Jdf cannot exceed Ic. Only when an additional, unique synapse fires does the current exceed Ic.

These unique synapses are referred to as rapid query synapses. The role of a rapid query synapse is complimentary to the role of an inhibitory synapse. In the typical operation of a dendrite, the response of the dendrite depends on the activities of the input excitatory synapses, and the role of inhibition is to effectively cancel the excitatory inputs. In one sense, the function of a rapid query synapse is the opposite of the function of an inhibitory synapse. With rapid query, a dendrite is designed so that the sum of all excitatory synaptic responses is insufficient to evoke a dendritic response. However, the function of the rapid query synapse is to drive the dendrite right up to its threshold, and therefore any excitatory input present at the time the rapid query synapse fires evokes a dendritic response. The circuit implementing this unique synapse is identical to all synapses considered thus far (FIG. 2), but the function is unique. This synapse is designed to saturate with each synapse event and to decay rapidly, providing an identical response to each synapse event and no synaptic weight variation. The action of this synapse is to allow Jdf to quickly sample the value of Idr at a given instant in time. A dendrite with one or more excitatory synapses and a single rapid query synapse behaves as if it were always under the influence of inhibition until the rapid query synapse fires, briefly releasing it from inhibition. When the rapid query synapse fires, the current generated in the DI loop provides an answer to the question, "How much current is in the DR loop?"

As stated above, the function of a rapid query synapse is the opposite of the function of an inhibitory synapse. However, in another sense the objective is the same. A primary function of inhibition in neural systems is to dynamically adapt a given structural network into multiple functional networks. When inhibition is applied to a dendrite, the dendrite is functionally disconnected from the neuron cell body. Similarly, with rapid query, a dendrite is functionally disconnected from the neuron cell body except when a rapid query synapse has fired. Rapid query operation provides another means to rapidly adapt the structural network into myriad functional networks, and rapid query is likely to be more energy efficient than inhibition when information stored in certain dendrites need not be accessed frequently. In biological neural systems, a given neuron either makes inhibitory connections or excitatory connections, but not both. This is referred to as Dale's law. It may be a consequence of physiological limitations, or it may be due to an information-processing advantage resulting from differentiating the responsibility of excitatory neurons that spread information and inhibitory neurons that adapt the functional network. Such differentiation can be advantageous in superconducting optoelectronic networks as well, in which case neurons dedicated to inhibition will make only inhibitory synaptic connections, and neurons dedicated to rapid query will form only rapid query synapses. These neurons are referred to as rapid query neurons. The role of a rapid query neuron is to quickly cause the information stored in a collection of dendrites to be communicated from those dendrites further along the respective dendritic trees toward the neuron cell bodies, thereby rapidly functionally connecting those dendrites to the active network.

Figure 18:
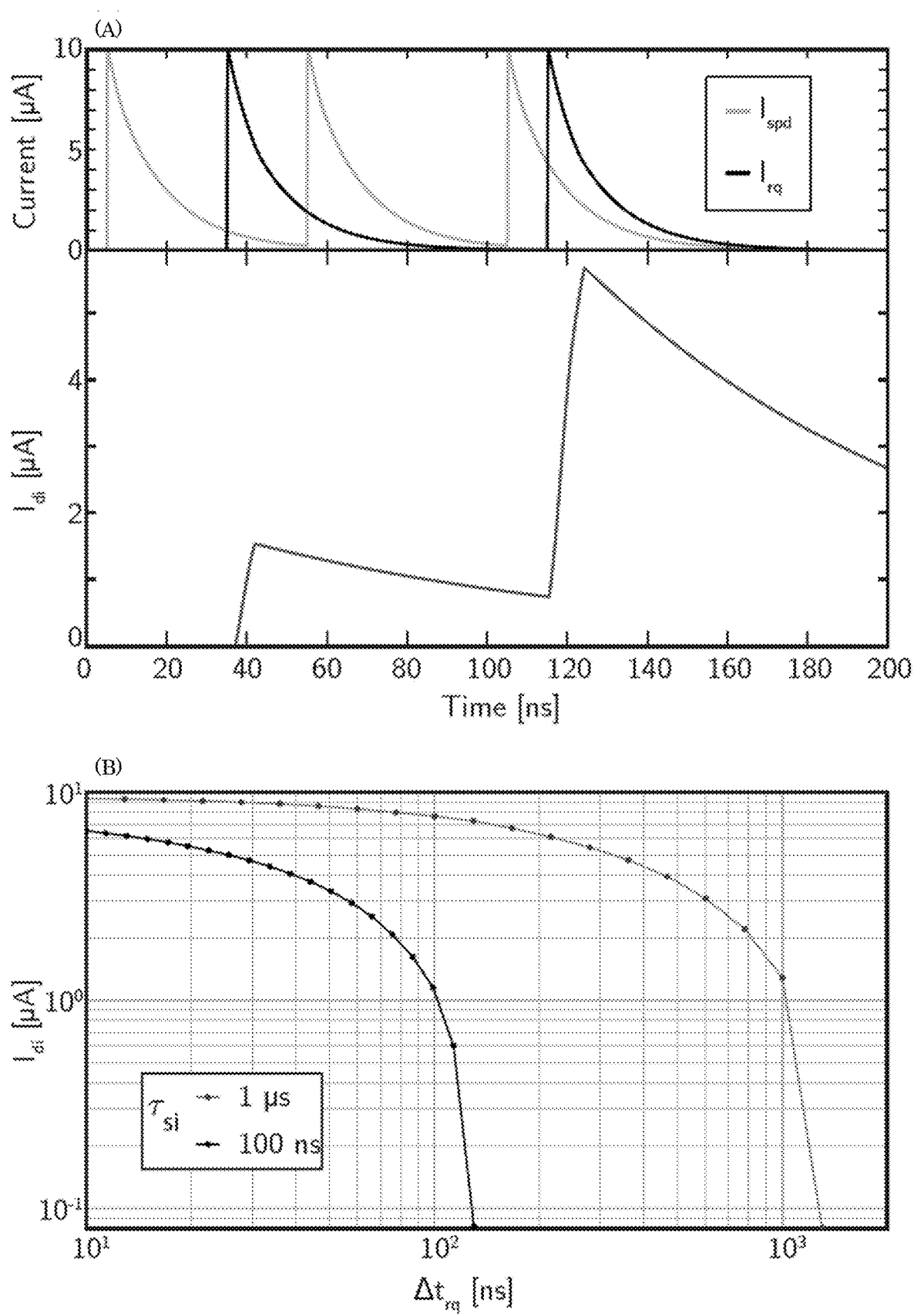
FIG. 18 shows rapid query. (a) Temporal response of a single excitatory synapse and a single rapid query synapse coupled to a DR loop. The upper panel shows the pulses resulting from photon detection events on the excitatory and rapid query synapses, while the lower panel shows the current generated in the DI loop by the two rapid query events. (b) Systematic quantification of the result of rapid query activity following a single excitatory pulse. The current generated in the DI loop, $I_{di}$, is plotted as a function of the time delay between the excitatory synapse event and the rapid query synapse event. All simulations in this figure were conducted with $\tau_{rq}$=10 ns.

FIG. 18 shows rapid query operation. The circuit under consideration comprises a single excitatory synapse and a single rapid query synapse coupled to a DR loop in the configuration of FIG. 3(b). In the present example, three excitatory synapse events occur, as seen in the upper panel of FIG. 18(a). Two rapid query synapse events are also shown in that panel. The first rapid query event follows the first excitatory pulse by 30 ns, and with τsi=20 ns, only a small amount of current is added to the DI loop. The second excitatory event is not followed by a rapid query event, and no current is added to DI. The third excitatory event is followed by a rapid query event with 10 ns delay, and significantly more current is induced in the DI loop.

The behavior of this circuit is summarized more systematically in FIG. 18(b). Here we plot the current induced in the DI loop as a function of the time delay between the rapid query and excitatory events for two values of τsi. We see that the signal generated by rapid query follows the exponential decay of the SI loop, thus providing an accurate mapping of Isi to Idi at the time rapid query was performed.

We plot the exponential functions of FIG. 18(b) on a log-log graph to emphasize that each SI loop provides information over a single time scale determined by τsi. It would be desirable to find a means by which a memory trace may be extended across multiple time scales from a single photonic synapse event. This increased temporal dynamic range is one example of what can be achieved if electronic copies of photonic synapse events are produced.

Regarding fluxonic fan-out from photonic synapses, in neural systems using light for communication, generation and detection of photons are likely to consume energy. Several example operations can be performed in the electronic domain to extract information from photonic pulse trains and their synaptic reception and can be performed simultaneously without an additional photonic synapse for each. Fluxons can be copied with a pulse splitter to fan-out of flux-quantum signals. Output signals can be copied from a single photonic synapse to multiple independent SI loops that can each perform different temporal filters and feed into different dendrites. These are referred to as electronic synapses, and each photonic synapse can feed multiple electronic synapses.

The circuit for splitting pulses is shown in FIG. 4. A fluxon enters from the left, and when it switches the initial junction, the current of the resulting fluxon is split to two subsequent junctions. These junctions are biased such that the amount of current is enough to exceed Ic, thus producing fluxons at both junctions with restored signal level. For the application at hand, the splitter of FIG. 4 can be placed following $J_{jtl}$ in FIG. 2 or FIG. 3. Thus, signals produced by synapses or dendrites can be copied and processed independently to extract distinct information through multiple temporal filters and logical operations. The circuit of FIG. 4 achieves direct one-to-two fan-out. If a greater number of copies is desired, the same circuit can be repeated in a tree. The limits of this fan out will depend on one's tolerance for circuit complexity. We speculate that in mature systems, a given photonic synapse may split to as many as 10 electronic synapses. The axonal arbor could implement one-to-one-thousand fan-out with branching photonic waveguides across a broad spatial range and an additional one-to-ten fan-out from each photon detector to electronic synapses across a much more limited spatial range. Total fan-out would then be one-to-ten-thousand, comparable to biological neurons in many regions of the brain.

Figure 19:
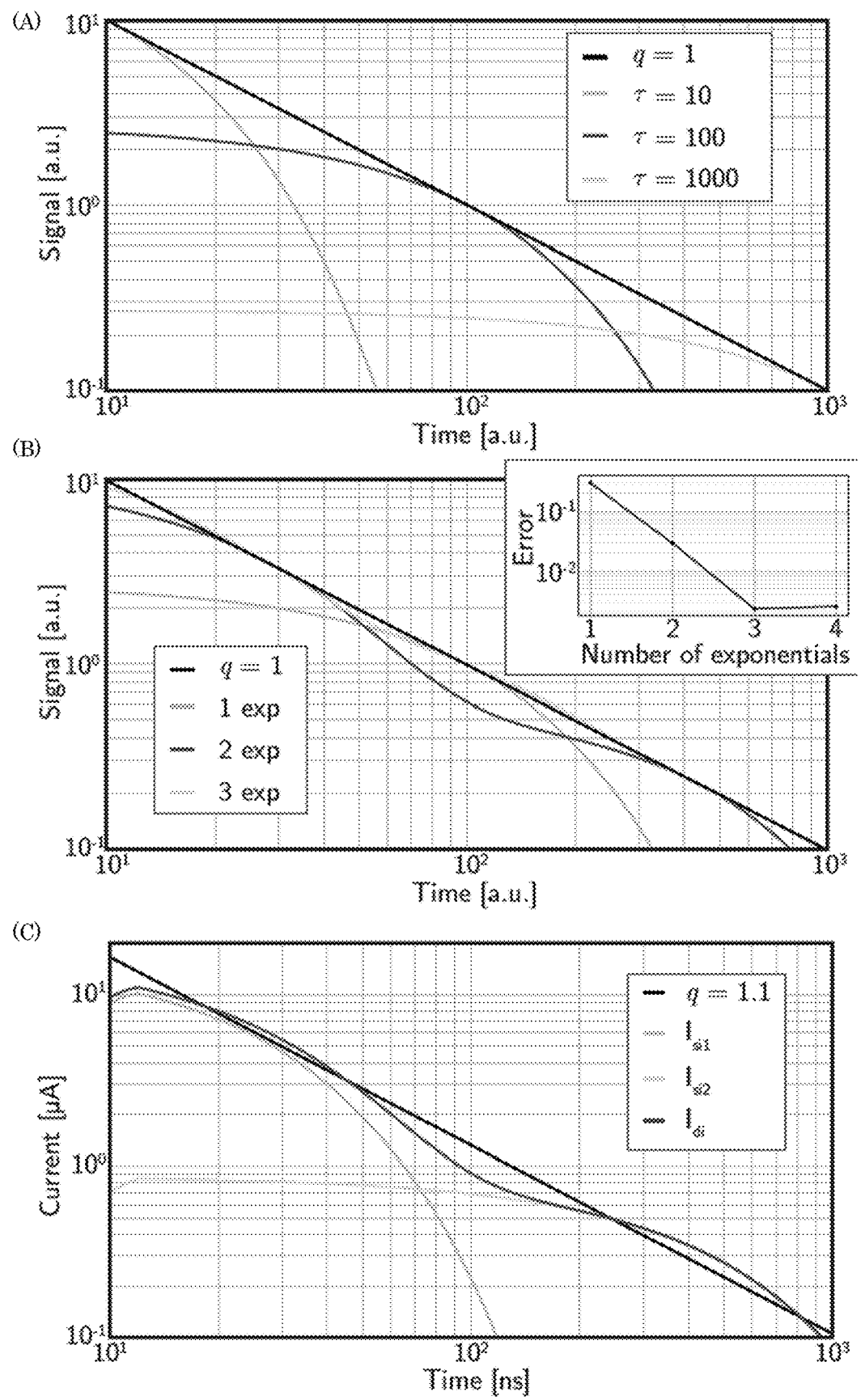
FIG. 19 shows an approximation of power-law temporal decay. (a) Illustration of the differences between power-law and exponential decay on a log-log plot. The functions plotted are f(t)∝t-q and g(t)∝e-t/τ, referred to generally as "Signal". (b) Approximating power-law decay through the superposition of multiple exponentials. A power law function with unity exponent is shown, as are approximations composed of one to three exponentials. Amplitudes and time constants were adjusted for best fit, and convergence is shown in the inset. (c) Approximating power-law decay with two SI loops coupled to a common DR loop. The time constants and mutual inductances have been chosen to approximate a power law using the same fitting algorithm that generated (b).

As a simple example of the utility of pulse splitting, we consider one photonic synapse feeding into two electronic synapses with different time constants. FIG. 19 summarizes employing two different time constants. Instead of retaining a memory trace of a synapse event over only a single temporal scale, as occurs in a single SI loop with exponential decay with one time constant, we would prefer a signal with a power-law decay, so that information across temporal scales can be accessed. In FIG. 19(a) we compare $f(t) \propto t-q$ to $g(t) \propto e-t/\tau$ for three values of τ, taking the power-law exponent to be q=1. This figure illustrates the principle that a power-law temporal decay represents information across multiple orders of magnitude in time, while an exponential function only has a single time constant, and therefore represents information across roughly one order of magnitude. For example, in FIG. 19(a), the power-law decay has an appreciable signal spanning two orders of magnitude in time. By contrast, the smallest value of τ provides no information past its cutoff, and the signal from the largest value of τ is nearly constant initially across more than an order of magnitude. The middle value gives a poor representation at the start and the end. However, we can obtain a suitable approximation to the power law function by superposing a small number of exponentials, as shown in FIG. 19(b). Here we represent a power law with unity exponent (q=1), mapping two orders of magnitude in time to two orders of magnitude in signal. Convergence is shown in the inset. The error is improved by an order of magnitude when using two exponentials instead of one, and there is little advantage to using more than three for this task.

We implement this principle with the circuits under consideration by copying the signal from a photonic synapse to two electronic synapses coupled to a common passive superconducting loop via mutual inductors. We choose the time constants and couplings of the two SI loops to approximate the fitting technique employed to produce FIG. 19(b). FIG. 19(c) shows the current in each of the SI loops as well as the common output loop. A power law with q=1.1 is shown for comparison. This power-law temporal extension can be used in conjunction with many of the other operations discussed thus far, with the objective to use cheap fluxonic operations to extend the memory trace of expensive photonic activity across extra orders of magnitude in time. Such an operation performs a power-law mapping of a temporal signal to the dynamic range of the firing junction and allows a single dendrite to retain and access information regarding both gamma and theta frequencies.

This example of using pulse splitting to access broader time spans is a straightforward extension of the behavior of a single SI loop. Additional functionality can be envisioned by combining pulse splitting with many of the functions discussed in this paper. Most importantly, by copying the output from a photonic synapse, each of the operations discussed here can be performed concurrently. With a single photon, the dendritic tree can be provided with information regarding the synapse's average firing rate across multiple temporal scales; the time since the last synaptic firing; various quantities regarding initiation and duration of pulse trains; coincidences and sequences with synapses from multiple other neurons; and inhibition and rapid query applied independently to each of these pieces of information.

Synaptic and dendritic operations can be achieved with Josephson junctions and mutual inductors. These include various logical operations, temporal filters, and nonlinear transfer functions applied to one or more synapses. The operations performed here are all accomplished with configurations of the building blocks shown in FIG. 2, FIG. 3, and FIG. 4. The dendritic tree can include a complex network of synapses and dendrites performing a multitude of computations on signals that fan in from photonic synapses, traverse the dendritic tree, and feed the neuron's final thresholding compartment, which triggers the production of light. A network can include many neurons, and each neuron is itself a network. Dynamic functional adaptation of the dendritic network involves inhibition and rapid query. Inhibitory activity nullifies targeted portions of the tree, while rapid query obtains local fragments of information and passes them along the tree. Electronic copies of photonic synapse events provide operations with information from detection of a single photon.

Superconducting computation is complimentary to photonic communication for achieving large-scale neural systems. While photons can achieve fan-out, they lack the nonlinearities for computation, especially at the low light levels required for energy efficiency. Further, photon motion cannot be halted to enable memory retention. Additionally, generating photons is more expensive than generating fluxons, and therefore only the minimum number of photons required for communication should be generated. Superconducting circuits are complimentary to photonic circuits in these regards. The fluxonic processor here has greater than one-to-one-thousand fan-out in the photonic domain from each neuron to its connections, and subsequently, at each neuronal terminal an additional factor of roughly one-to-ten fan-out in the electronic domain, providing each receiving neuron with the capability of analyzing much more information about synaptic activity than would be available from a single synapse alone. Fan-in is envisioned to occur in the electronic domain as the dendritic tree computes and feeds its signals into the neuron cell body, ultimately resulting in a binary decision of whether to fire. Superconducting-nanowire single-photon detectors enable binary communication in that the response is nearly identical whether one or more photons are detected, and all computations—including synaptic weighting, nonlinear processing, and temporal integration—occur in superconducting electronic circuits with sub-nanosecond response times, native nonlinearities, and the potential for signal retention with no dissipation.

In mature superconducting optoelectronic circuits, system-level considerations will inform decisions regarding trade-offs between energy consumption and performance. One could reduce energy and area consumption by omitting dendritic processing entirely, but this would leave out important information processing. At the physical level, these operations include light production during neuronal firing, photon detection during synapse events, and fluxonic processing in the dendritic tree. Energy expended on light production, photon detection, and fluxonic processing can be roughly equal and indicates a global optimum wherein improvements to any one aspect of the system provide little added benefit, as other contributions become limiting factors. Production of a fluxon requires $Ej=Ic\Phi 0/2\pi=1.3\times 10^{-20}$ J for the junctions considered here, while production of a photon involves $Ep=hv/\eta=1.6\times 10^{-19}\eta$ J, where $\eta$ is the photon production efficiency, and we consider operation at $\lambda=1.22$ μm. Light generation is expensive because $\eta$ is unlikely to ever exceed 0.1 and may be limited to 0.01 or worse. Likewise, photon detection requires $Ed=L_{spd}I^2_{spd}/2=1.3\times 10^{-17}$ J for the superconducting-nanowire single-photon detector designs presented here. Due to the requirement of engineering reset dynamics in the detector, $L_{spd}$ cannot be reduced below a certain value without decreasing the normal-state resistance of Jsf, which requires increasing Ic, which increases Ej. Similarly, Ispd cannot decrease without using either junctions with smaller Ic or operating them in a noisy regime with bias close to Ic and would result in reduction of the dynamic range of the synaptic weight. This space of trade-offs is complex, and we make no attempt to identify the optimum in this work. We simply note that if $\eta=0.01$, Ispd=10 μA, Lspd=250 nH, Ic=40 μA, and full analog processing of each synapse event generates 103 fluxons on average, then light generation, detection, and fluxonic processing each contribute roughly equally to energy consumption. Full optoelectronic integration with few-photon binary communication and superconducting electronic analog computation offers a route to balance the energy budget while enabling the requisite communication and repertoire of computational functions for large-scale artificial cognitive systems.

With inhibition, branches of the dendritic tree are functionally responsive by default and are selectively silenced by inhibitory synapse events. Inhibition can lead to synchronization by opening brief temporal windows when groups of neurons can fire. With rapid query, branches of the dendritic tree are silent by default and are only functionally connected if rapid query synapse events occur. If the information in a given dendrite need not be accessed regularly, rapid query will be more energy efficient than continually performing inhibition. Like inhibition, rapid query may be useful for inducing synchronization. We propose addition rather than rapid query. Both inhibition and rapid query may be leveraged to enable sub-threshold oscillations to be sampled only when required by the network, as occurs in biological neural systems to direct attention and amplify relevant information. Use of a dedicated class of rapid query neurons in superconducting optoelectronic networks even though there may be no class of neurons in the biological domain. This may be due to a computational inadequacy of rapid query that we have overlooked, or it may be that the circuits under consideration are more amenable to such a mode of operation, which requires a degree of control over competing circuit parameters. There are dozens of different, specialized neurons in the mammalian brain, with multiple types of inhibitory neurons playing specific roles. Superconducting optoelectronic networks take significant inspiration from the brain, but hardware discrepancies can lead to deviations in computation. Rapid query neurons can be a departure.

There are multiple possible extensions of the functions considered here as well as further details to be considered. XOR may be achieved with pulse splitting and lateral inhibition between dendrites. We have only considered binary inhibition, but weaker or multiple IH loops could be coupled to a DR loop to achieve partial inhibition. The neural operations considered here tend toward analog operation of the superconducting circuits, and we have presented circuits capable of representing signals with eight to 10 bits of resolution based on the βL values chosen for the integration loops. However, this resolution is only available if noise is sufficiently low, so further investigation is required to determine a suitable tradeoff between loop inductance, signal resolution, and operating temperature. We considered signal storage loops with retention times on the order of what we suspect will be the gamma and theta frequencies of the system.

Dendritic bias current Ide can be used to adjust circuit operation, pointing to a means of achieving learning and plasticity between synapses and dendrites or between two dendrites. Circuits used for spike-timing-dependent plasticity can be used to implement activity-based weight update functions.

In addition to the first layer of dendritic hierarchy, the same dendritic building block of FIG. 3 can be tiled essentially arbitrarily. The depth of this tree is enabled by the logic-level restoration occurring in the basic circuit. Design of the DI loop is independent of the DR loop, and regardless of the configuration of the inputs to the DR loop, as long as threshold can be reached, flux can be added to the DR loop, and a restored current level can be attained with as few as one fluxon. In this work, that current level is around 10 µA, but it could be designed to be higher or lower as needed. This logic-level restoration enables a many-compartment dendritic tree to be as deep as needed for the desired information processing. At the base of the tree is the soma, or cell body. The soma receives signals just as any of the other dendrites, but its output feeds into an amplifier chain that leads to the production of light. Because nanowire single-photon detectors have a binary response, each neuron-to-synapse communication event also results in logic-level restoration, but between neurons and synapses rather than dendrites.

Beyond specifics related to the superconducting optoelectronic hardware implementation, circuit designs include dendritic structure beyond the point-neuron model for neural processing. Quantification of dendritic information processing is difficult in biological experiments due to the length scales involved, the sensitivity of the neurons and dendrites under study, and the inability to design or control the circuits being investigated. The circuits presented here can be precisely designed, fabricated, manipulated, and measured, potentially leading to traction on theoretical models of dendritic processing. The dendritic tree provides information about temporal activity on a neuron's afferent synapses. Design maximizes knowledge in the dendritic tree and the arbor's communication of that information to the cell body. Versatile hardware implementations of neurons with various dendritic processing capabilities provide information and function of dendrites in biological and artificial neural systems.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A fluxonic processor for fluxonic processing of photonic synapse events, the fluxonic processor comprising:
   a transmitter that receives neuron signal and produces output photons from the neuron signal;
   a neuron in electrical communication with the transmitter and that receives a dendrite signal, produces the neuron signal from the dendrite signal, and communicates the neuron signal to the transmitter;
   a dendrite in electrical communication with the neuron and that receives a synapse signal, produces the dendrite signal from the synapse signal, and communicates the dendrite signal to the neuron, the dendrite comprising:
      a dendritic receiver loop that receives the synapse signal from a synapse and produces dendrite receiver fluxons;
      a dendritic Josephson isolator in communication with the dendritic receiver loop and that receives the dendrite receiver fluxons from the dendritic receiver loop; and
      a dendritic integration loop that receives the dendrite receiver fluxons from the dendritic Josephson isolator and produces the dendrite signal from the dendrite receiver fluxons; and
   the synapse in electrical communication with the dendrite and that receives an input photon, produces the synapse signal from the input photon, and communicates the synapse signal to the dendrite, the synapse comprising:
      a synaptic receiver that receives the input photon and produces synaptic receiver fluxons;
      a synaptic Josephson isolator in communication with the synaptic receiver and that receives the synaptic receiver fluxons from the dendritic receiver loop; and
      a synaptic integration loop that receives the synaptic receiver fluxons from the synaptic Josephson isolator and produces the synapse signal from the synaptic receiver fluxons.

2. The fluxonic processor of claim 1, further comprising:
   a fluxon pulse splitter in electrical communication with the dendrite and that receives the dendrite signal from the dendrite and splits the dendrite signal into a first output signal and a second output signal,
   wherein the first output signal and the second output signal are dendrite signals.

3. The fluxonic processor of claim 2, wherein the fluxon pulse splitter comprises:
   a splitter input inductor that receives the dendrite signal as an input signal;

a splitter current source and a splitter current source in electrical communication with the splitter input inductor;

a first Josephson isolator in electrical communication with the splitter input inductor and that receives fluxons from the splitter input inductor and produces a first output signal from the fluxons; and a second Josephson isolator in electrical communication with the splitter input inductor and that receives fluxons from the splitter input inductor and produces a second output signal from the fluxons, wherein the first Josephson isolator and the second Josephson isolator are electrically connected in parallel to the splitter input inductor and independently comprise:

an isolation inductor that receives fluxons from the splitter input inductor;

a splitter current source in communication with the isolation inductor and that provides bias current to the Josephson isolator; and a Josephson transmission line in electrical communication with the isolation inductor.

4. The fluxonic processor of claim 1, further comprising:
a fluxon pulse splitter in electrical communication with the synapse and that receives the synapse signal from the synapse and splits the synapse signal into a first output signal and a second output signal, wherein the first output signal and the second output signal are synapse signals.

5. The fluxonic processor of claim 4, wherein the fluxon pulse splitter comprises:

a splitter input inductor that receives the synapse signal as an input signal;

a splitter current source and a splitter current source in electrical communication with the splitter input inductor;

a first Josephson isolator in electrical communication with the splitter input inductor and that receives fluxons from the splitter input inductor and produces a first output signal from the fluxons; and a second Josephson isolator in electrical communication with the splitter input inductor and that receives fluxons from the splitter input inductor and produces a second output signal from the fluxons, wherein the first Josephson isolator and the second Josephson isolator are electrically connected in parallel to the splitter input inductor and independently comprise:

an isolation inductor that receives fluxons from the splitter input inductor;

a splitter current source in communication with the isolation inductor and that provides bias current to the Josephson isolator; and a Josephson transmission line in electrical communication with the isolation inductor.

6. The fluxonic processor of claim 1, wherein the synaptic receiver comprises:

a single photon detector that comprises:

a variable resistor that receives the input photon; and a photodetector inductor in electrical communication with the variable resistor;

a synapse current source in electrical communication with the photodetector inductor and that provides synaptic bias current;

a photodetector resistor in electrical communication with the photodetector inductor and that provides a photodetector current to the synaptic receiver; and a synaptic firing junction in electrical communication with the photodetector resistor, wherein the synaptic receiver produces fluxons in response to receiving the input photon.

7. The fluxonic processor of claim 6, wherein the synaptic Josephson isolator comprises:

an isolation inductor in communication with the synaptic firing junction and that receives fluxons from the synaptic receiver;

a synapse current source in communication with the isolation inductor and that provides synaptic bias current to the synaptic Josephson isolator; and a Josephson transmission line in electrical communication with the isolation inductor.

8. The fluxonic processor of claim 7, wherein the synaptic integration loop comprises:

a synaptic integration inductor in communication with the synaptic Josephson isolator and that receives fluxons from the synaptic Josephson isolator and provides a synaptic integration loop inductance;

a synaptic integration Josephson junction in communication with the isolation inductor of the synaptic Josephson isolator;

a synaptic coupling inductor in communication with the synaptic integration inductor and that provides a synaptic integrated current to the synaptic integration loop; and a synaptic integration resistor in communication with the synaptic integration resistor.

9. The fluxonic processor of claim 1, wherein the dendritic receiver loop comprises:

a mutual inductor inductively coupled to the synaptic integration loop of the synapse;

a dendritic reset junction in electrical communication with the mutual inductor;

a dendrite current source in electrical communication with the dendritic reset junction and that provides dendritic bias current;

a dendritic firing junction in electrical communication with the dendritic reset junction and the dendrite current source; and a dendrite receiver inductor in electrical communication with the dendritic firing junction and the mutual inductor.

10. The fluxonic processor of claim 9, wherein the dendritic Josephson isolator comprises:

an isolation inductor in communication with the dendritic firing junction and that receives fluxons from the dendritic receiver loop;

a dendrite current source in communication with the isolation inductor and that provides bias current to the dendritic Josephson isolator; and a Josephson transmission line in electrical communication with the isolation inductor.

11. The fluxonic processor of claim 10, wherein the dendritic integration loop comprises:

a dendritic integration Josephson junction in communication with the dendritic Josephson isolator and that receives fluxons from the dendritic Josephson isolator;

a dendritic integration inductor in communication with the dendritic integration Josephson junction and that provides a dendritic integration loop inductance to the dendritic integration loop;

a dendritic coupling inductor in communication with the dendritic integration inductor and that provides a dendritic integrated current to the dendritic integration loop; and a dendritic integration resistor in communication with the dendritic integrated current.

12. A process for fluxonic processing of photonic synapse events with the fluxonic processor of claim 1, the process comprising: receiving an input photon by the synaptic receiver of the synapse; producing fluxons by the synaptic receiver; receiving the fluxons by the synaptic Josephson isolator from the synaptic receiver; communicating fluxons from the synaptic Josephson isolator to the synaptic integration loop; receiving the fluxons from the synaptic Josephson isolator by the synaptic integration loop; producing a synaptic integrated current from the fluxons by a synaptic coupling inductor; inductively coupling the synaptic integrated current from the synaptic integrated current to a mutual inductor of the dendrite; receiving the synaptic integrated current by the mutual inductor from the synaptic integration loop; producing dendrite current in the dendritic receiver loop from receiving the synaptic integrated current; receiving the dendritic current from the dendritic receiver loop by the dendritic Josephson isolator; communicating fluxons from the dendritic Josephson isolator to the dendritic integration loop in response to receiving the dendritic current; receiving fluxons from the dendritic Josephson isolator by the dendritic integration loop; and producing dendritic integrated current as a dendrite signal in response to receiving the fluxons by the dendritic integration loop to fluxonic process receipt of the input photon with the fluxonic processor.

13. The process of claim 12, further comprising:
communicating the dendrite signal from the dendrite; and
receiving the dendrite signal from the dendrite by the neuron.

14. The process of claim 13, further comprising:
producing a neuron signal by the neuron in response to receiving the dendrite signal from the dendrite; and
communicating the neuron signal from the neuron.

15. The process of claim 14, further comprising:
receiving the neuron signal by a transmitter from the neuron;
producing output photons by the transmitter in response to receiving the neuron signal from the neuron; and
communicating the output photons from the transmitter.

* * * * *